United States Patent
Uego et al.

(10) Patent No.: US 10,234,532 B2
(45) Date of Patent: Mar. 19, 2019

(54) TRACKING SYSTEM, TRACKING METHOD, AND NON-TRANSITORY COMPUTER-READABLE RECORDING MEDIUM STORING PROGRAM

(71) Applicant: MITSUBISHI ELECTRIC CORPORATION, Chiyoda-ku (JP)

(72) Inventors: Naoya Uego, Chiyoda-ku (JP); Yuji Sakai, Chiyoda-ku (JP); Masakazu Saito, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 592 days.

(21) Appl. No.: 14/900,500

(22) PCT Filed: May 15, 2014

(86) PCT No.: PCT/JP2014/062949
§ 371 (c)(1),
(2) Date: Dec. 21, 2015

(87) PCT Pub. No.: WO2015/001848
PCT Pub. Date: Jan. 8, 2015

(65) Prior Publication Data
US 2017/0010341 A1    Jan. 12, 2017

(30) Foreign Application Priority Data
Jul. 3, 2013  (JP) .................................. 2013-139493

(51) Int. Cl.
*G01S 3/42* (2006.01)
*H01Q 3/08* (2006.01)
*H01Q 1/12* (2006.01)

(52) U.S. Cl.
CPC ............. *G01S 3/42* (2013.01); *H01Q 1/1257* (2013.01); *H01Q 1/1264* (2013.01); *H01Q 3/08* (2013.01)

(58) Field of Classification Search
CPC ........ G01S 3/42; H01Q 1/1257; H01Q 1/125; H01Q 1/1264; H01Q 3/08; H01Q 3/12
See application file for complete search history.

(56) References Cited

U.S. PATENT DOCUMENTS

| 4,837,576 A | 6/1989 | Schwarz |
| 4,994,812 A | 2/1991 | Uematsu et al. |
| (Continued) | | |

FOREIGN PATENT DOCUMENTS

| CA | 2084972 | 6/1996 |
| CN | 1236523 A | 11/1999 |
| (Continued) | | |

OTHER PUBLICATIONS

English Translation of JP 60-22803 A (Year: 1985).*
(Continued)

*Primary Examiner* — Bernarr E Gregory
*Assistant Examiner* — Fred H Mull
(74) *Attorney, Agent, or Firm* — Oblon, McClelland, Maier & Neustadt, L.L.P.

(57) ABSTRACT

A rotation determiner determines whether an antenna azimuth (AZ) angle rotates beyond a rotation range within a predetermined time based on a predicted orbit value. When the antenna AZ angle rotates beyond the rotation range, an orbit determiner determines whether an estimated satellite position is within a drivable range that the AZ angle rotates from a reference value beyond the rotation range. When the AZ angle rotates beyond the rotation range and the estimated satellite position is within the drivable range, three-axis control is executed, and the AZ angle is kept at a predeter-
(Continued)

mined value. When the AZ angle rotates beyond the rotation range and the estimated satellite position is not within the drivable range, or when the AZ angle does not rotate beyond the rotation range, two-axis control is executed.

9 Claims, 16 Drawing Sheets

(56) References Cited

U.S. PATENT DOCUMENTS

| | | | |
|---|---|---|---|
| 4,994,815 A * | 2/1991 | Nakayama | G01S 3/42 343/765 |
| 5,073,783 A | 12/1991 | Uematsu et al. | |
| 5,309,162 A | 5/1994 | Uematsu et al. | |
| 2003/0115600 A1 | 6/2003 | Tanaka | |
| 2003/0179145 A1 | 9/2003 | Kanzaki | |
| 2004/0268392 A1 | 12/2004 | Tanaka | |
| 2009/0224988 A1 | 9/2009 | Park | |

FOREIGN PATENT DOCUMENTS

| | | |
|---|---|---|
| CN | 1457532 A | 11/2003 |
| EP | 0 373 604 A1 | 6/1990 |
| JP | 60-22803 A | 2/1985 |
| JP | 61-86666 A | 5/1986 |
| JP | 6-252625 A | 9/1994 |
| JP | 07-202541 A | 8/1995 |
| JP | 09-284033 A | 10/1997 |
| JP | 10-090389 A | 4/1998 |
| JP | 2001-237629 A | 8/2001 |
| JP | 2002-043820 A | 2/2002 |
| WO | WO 2008/030041 A1 | 3/2008 |

OTHER PUBLICATIONS

English Translation of JP 09-284033 A (Year: 1997).*
English Translation of JP 10-90389 A (Year: 1998).*
International Search Report dated Aug. 19, 2014 for PCT/JP2014/062949 filed on May 15, 2014.
Combined Chinese Office Action and Search Report dated Apr. 13, 2017 in Patent Application No. 201480038066.8 (with English Translation and English Translation of Category of Cited Documents).
Office Action dated Sep. 6, 2016 in Japanese Patent Application No. 2015-525081 (with unedited computer generated English translation).

* cited by examiner

FIG. 12
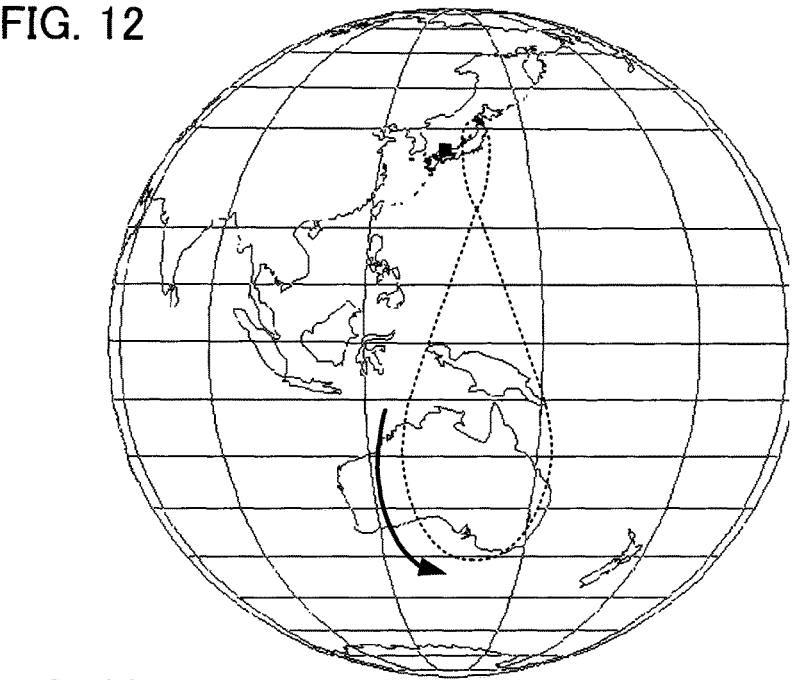
FIG. 13    xEL AXIS DRIVABLE RANGE
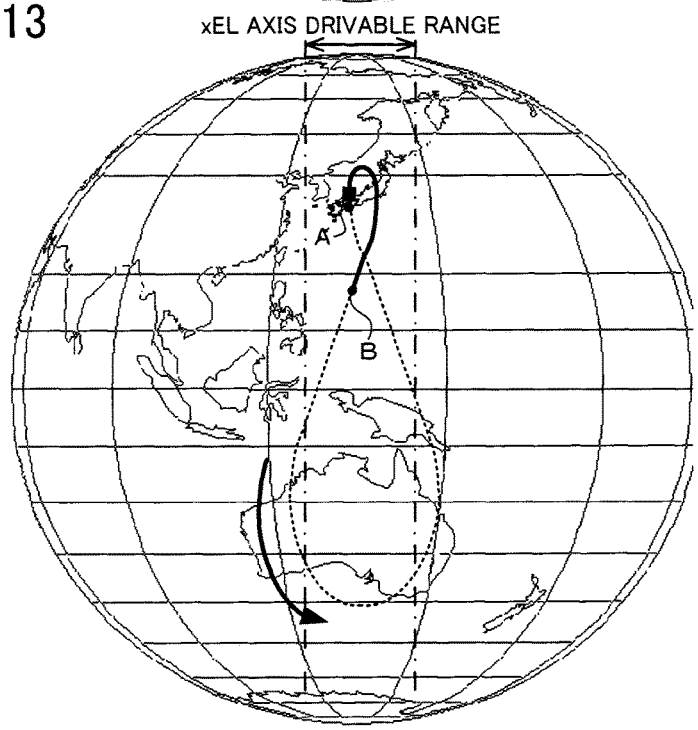

ed value that is permissible for the azimuth angle, the tracking system can track the target without rewinding cables, by setting an angle of the azimuth axis to the predetermined value and driving the drive axes of the antenna.

TRACKING SYSTEM, TRACKING METHOD, AND NON-TRANSITORY COMPUTER-READABLE RECORDING MEDIUM STORING PROGRAM

TECHNICAL FIELD

The present disclosure relates to a tracking system, a tracking method and a non-transitory computer-readable recording medium storing a program used for tracking a target.

BACKGROUND ART

Conventionally, based on a pre-obtained predicted value of a satellite orbit, beam direction of an antenna is controlled by controlling drive axes of the antenna to track a satellite.

A three-axis control antenna device disclosed in the patent literature 1 sends input to drive inputs of two axes among drive inputs of three axes that are driven and controlled individually when a beam direction of an antenna is at an angle less than a set elevation angle, and sends inputs to all drive inputs of three axes when the beam direction is greater than or equal to the set elevation angle. After switching to three-axis driving, the three-axis control antenna device sends a value of a particular axis obtained by calculating present values of the three axes to the drive input of the particular axis among the three axes.

A satellite tracking antenna driving and controlling device disclosed in patent literature 2 calculates a program prediction angle oriented toward a satellite at each predetermined time interval using a program tracking method that tracks a satellite by driving an antenna of the azimuth/elevation mount method or the X/Y mount method based on a pre-obtained orbit prediction information of a satellite. In addition, when a satellite is predicted to pass in the vicinity of zenith based on the program prediction angle, X/Y coordinates are chosen as coordinates used in an interpolation process to calculate a program command angle directing to a satellite at a time interval shorter than the predetermined time interval.

CITATION LIST

Patent Literature

Patent Literature 1: Unexamined Japanese Patent Application Kokai Publication No. H07-202541.
Patent Literature 2: Unexamined Japanese Patent Application Kokai Publication No. 2001-237629.

SUMMARY OF INVENTION

Technical Problem

For example, when a satellite orbits in a figure eight orbit that is a quasi-zenith orbit and the zenith of an antenna is positioned inside the figure eight, if an azimuth axis and an elevation axis are driven and a beam direction of the antenna is controlled, rewinding of cables is required because the azimuth angle rotates 360 degrees or more. In other words, when a single antenna is arranged for one satellite, communication of the antenna with the satellite is not always possible. In addition, as the orbit of a quasi-zenith satellite is shifted little by little in the east-west direction due to perturbations, the zenith of the antenna can become positioned either inside or outside of the figure eight. When the zenith of the antenna is positioned outside of the figure eight, rewinding of the cable is not required. However, when the zenith of the antenna is positioned inside of the figure eight, rewinding of the cable is required as mentioned above. When an X-Y mount type antenna is used, rewinding of the cable is not required even when the zenith of the antenna is positioned inside of the figure eight. However, size of the antenna equipment increases.

The present disclosure is made to solve the problems described above, and an objective of the present disclosure is to track a target without rewinding the cable.

Solution to Problem

To achieve the above objective, a tracking system of the present disclosure includes a rotation determiner, an orbit determiner and a tracker and is a tracking system that drives the drive axes of an antenna and controls a beam direction of the antenna to track a target to receive a signal from the target. The rotation determiner determines whether an azimuth angle of the antenna tracking the target rotates beyond a predetermined rotation range within a predetermined duration of time based on an orbit prediction value that is a predicted value of a position of the target. When the rotation determiner determines that the azimuth angle rotates beyond the rotation range, the orbit determiner determines, based on either the orbit prediction value, or orbit information of the target, whether an estimated position of the target is within a drivable range in which the azimuth angle rotates from a reference value beyond the rotation range, and in which a cross elevation axis of the drive axes can be driven in a state in which an angle of an azimuth axis of the drive axes is set to a predetermined value that is permissible for the azimuth angle.

When the rotation determiner determines that the azimuth angle rotates beyond the rotation range and while the estimated position is within the drivable range, the tracker drives an elevation axis and the cross elevation axis of the drive axes and controls the beam direction of the antenna to track the target according to the orbit prediction value or an angle error signal indicating an error in the beam direction of the antenna, the angle error signal being generated based on the received signal, in a state in which the angle of the azimuth axis is set to the predetermined value.

When the rotation determiner determines that the azimuth angle rotates beyond the rotation range and while the estimated position is not within the drivable range, or when the rotation determiner determines that the azimuth angle does not rotate beyond the rotation range, the tracker drives the azimuth axis and the elevation axis and controls the beam direction of the antenna to track the target according to the angle error signal or the orbit prediction value.

Advantageous Effects of Invention

According to the present disclosure, while an estimated position of a target is within a range in which the azimuth angle of an antenna tracking the target rotates from a reference value beyond the rotation range, and in which the cross elevation axis can be driven in a state in which an angle of an azimuth axis is set to a predetermined value that is permissible for the azimuth angle, the tracking system can track the target without rewinding cables, by setting an angle of the azimuth axis to the predetermined value and driving the drive axes of the antenna.

BRIEF DESCRIPTION OF DRAWINGS

FIG. 12 is a drawing illustrating an example of a positional relationship between the antenna and the satellite orbit according to the first embodiment;

FIG. 13 is a drawing illustrating an example of the positional relationship between the antenna and the satellite orbit according to the first embodiment;

DESCRIPTION OF EMBODIMENTS

Hereinafter, embodiments of the present disclosure are described in detail with reference to the drawings. The same reference signs denote the same or similar portions throughout the drawings.

First Embodiment

Figure 1:
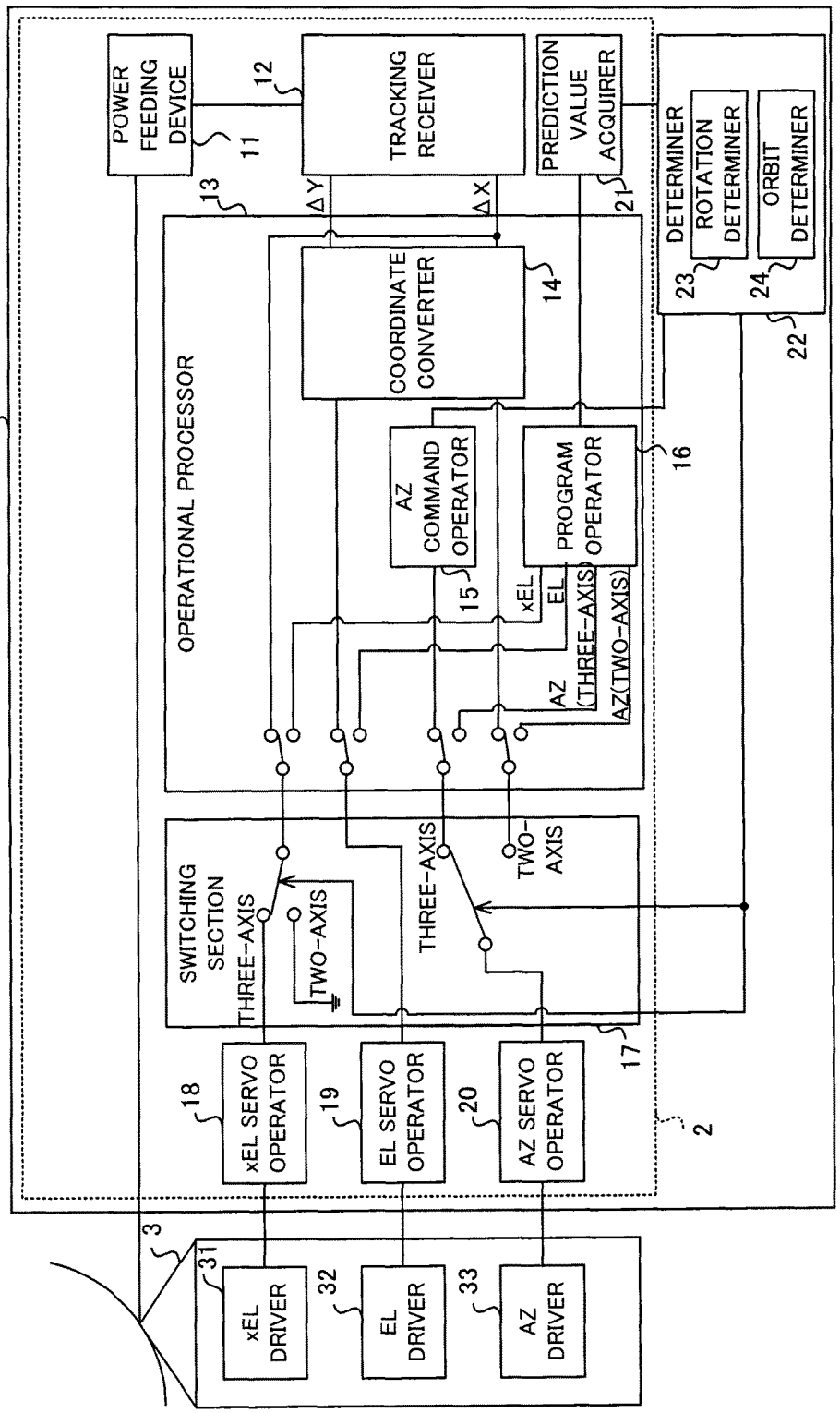
FIG. 1 is a block diagram illustrating a configuration example of a tracking system according to a first embodiment of the present disclosure.

FIG. 1 is a block diagram illustrating a configuration example of a tracking system according to a first embodiment of the present disclosure. The tracking system 1 controls a beam direction of an antenna 3 to track a target to receive a signal from the target. As an example, a satellite orbiting in an orbit is assumed to be a target. The tracking system 1 according to the first embodiment includes a tracker 2 that calculates an angle command value or an amount of an error of each drive axis for tracking the satellite and performs driving and controlling of the drive axes of the antenna 3, and a determiner 22 to determine switching between two-axis control and three-axis control.

The tracker 2 includes a power feeding device 11, a tracking receiver 12, an operational processor 13, a switching section 17 to switch between two-axis control and three-axis control, and a prediction value acquirer 21 to acquire an orbit prediction value. The power feeding device 11 detects a reference signal and an error signal from a satellite signal. The tracking receiver 12 demodulates and detects angle error signals for two axes from a reference signal and an error signal. The operational processor 13 performs a calculation process of the angle command values or the amounts of errors of each drive axis for controlling the beam direction of the antenna 3 to track the target. The tracker 2 also includes a cross elevation servo operator (hereinafter, referred to as an xEL servo operator) 18, an elevation servo operator (hereinafter, referred to as an EL servo operator) 19 and an azimuth servo operator (hereinafter, referred to as an AZ servo operator) 20 that supply motor drive power to drivers and control the drive axes, respectively.

The operational processor 13 includes a coordinate converter 14 that performs a coordinate conversion process of the angle error signals, an AZ command operator 15 to calculate an angle of an azimuth axis (hereinafter, referred to as an AZ axis) based on a beam direction of the antenna 3, and a program operator 16 that performs a calculation process of angle command values of each drive axis in the program tracking mode. The operational processor 13 receives actual angles from a cross elevation driver (hereinafter, referred to as an xEL driver) 31, an elevation driver (hereinafter, referred to as an EL driver) 32 and an azimuth driver (hereinafter, referred to as an AZ driver) 33.

Figure 2:
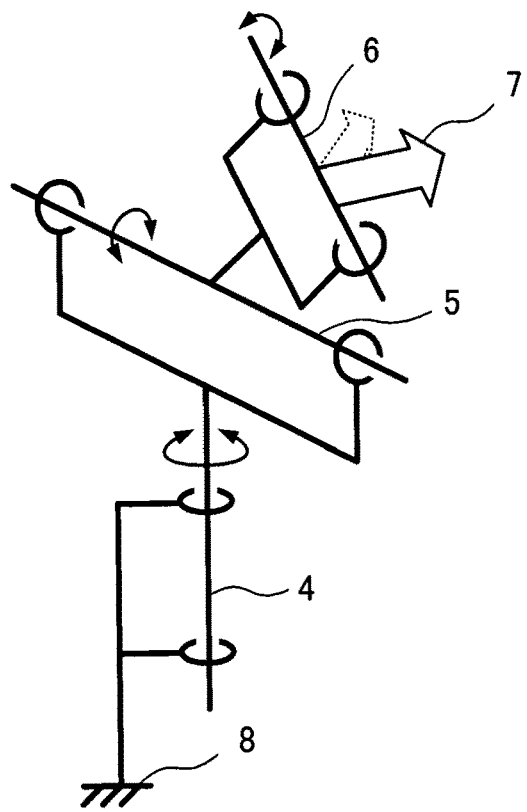
FIG. 2 is a conceptual drawing illustrating mutual relations of antenna mounts according to the first embodiment.

The antenna 3 includes the xEL driver 31, the EL driver 32 and the AZ driver 33 that drive the drive axes, respectively. FIG. 2 is a conceptual drawing illustrating mutual relations of an antenna mount according to the first embodiment. The antenna 3 includes three-axis drive axes of an AZ axis 4, an elevation axis (hereinafter, referred to as an EL axis) 5, and a cross elevation axis (hereinafter, referred to as an xEL axis) 6. The AZ axis 4 is supported by base 8, and is rotatable with respect to the base 8 around a vertical line. In the following explanation, angle of the AZ axis 4 is referred to as the AZ angle, angle of the EL axis 5 is referred to as the EL angle, and angle of the xEL axis 6 is referred to as the xEL angle. The AZ axis 4 performs mainly a function of AZ angle tracking of the antenna 3. The EL axis 5 is attached to the AZ axis 4 and is rotatable with respect to the AZ axis 4 around a line perpendicular to the AZ axis 4. The EL axis 5 is used for EL angle tracking. The xEL axis 6 is attached to the EL axis 5 and is rotatable with respect to the EL axis 5 around an axis perpendicular to the EL axis 5 in a certain angle range. Rotatable angle range of the xEL axis 6 is narrower than rotatable angle range of the EL axis 5. The antenna 3 is fixed to the xEL axis 6. Beam direction 7 of the antenna 3 can be pointed in any direction by the AZ axis 4, the EL axis 5, and the xEL axis 6. To track a target, the beam direction 7 of the antenna 3 is controlled by three-axis control to drive the AZ axis 4, the EL axis 5 and the xEL axis 6, or two-axis control to drive the AZ axis 4 and the EL axis 5.

Figure 3:
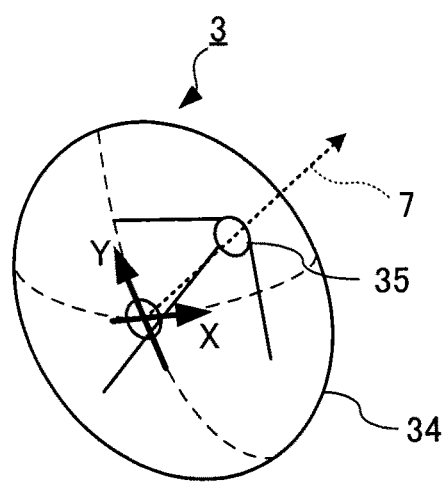
FIG. 3 is a drawing illustrating an example of an antenna according to the first embodiment.

The power feeding device 11 generates a reference signal and an error signal from a satellite signal received by at least one power feeding section included in the antenna 3 and sends to the tracking receiver 12. The tracking receiver 12 outputs angle error signals $\Delta X$ and $\Delta Y$ based on phase difference and amplitude ratio of the error signal to the reference signal. FIG. 3 is a drawing illustrating an example of an antenna according to the first embodiment. The antenna 3 is composed of a main reflecting mirror 34 and a sub-reflecting mirror 35. As illustrated in FIG. 3, the X-Y coordinate system is a coordinate system fixed to the main reflecting mirror 34. The beam direction 7 of the antenna 3 is displaced in the X direction when the EL axis 5 is rotated. In addition, the beam direction 7 of the antenna 3 is displaced in the Y direction when the xEL axis 6 is rotated. The coordinate converter 14 performs coordinate conversions of angle error signals $\Delta X$ and $\Delta Y$, calculates errors of the AZ angle and the EL angle in the case of the two-axis control and outputs the calculated errors. The AZ command operator 15 calculates a command value of the AZ angle based on a command value of the AZ angle and an actual AZ angle and outputs the calculated command value of the AZ angle.

The prediction value acquirer 21 acquires orbit prediction values that are prediction values of satellite positions at each time and sends to the program operator 16 and the determiner 22. The orbit prediction value includes an azimuth angle, an elevation angle and a distance at each time in a drive coordinate system of which origin is the antenna 3 and that moves in an inertial coordinate system due to the rotation of the earth. The distance means the distance from the antenna 3 to the satellite. A three-dimensional coordinate system taking the center of gravity of the earth as an origin, for example, is used as the inertial coordinate system. The earth rotates in the inertial coordinate system. Strictly speaking, the inertial coordinate mentioned above moves along the planetary orbit of the earth, although during a single orbital period of the satellite positioned close to the earth, the coordinate can be considered as an inertial coordinate. The program operator 16 calculates respective command values (value to maintain an AZ angle constant) of an xEL angle, an EL angle, an AZ angle in case of three-axis control, and an AZ angle in case of two-axis control based on the orbit prediction values. The program operator 16 outputs an error of a command value with respect to the actual angle.

The tracking system 1 has an automatic tracking mode controlling attitude of the antenna 3 based on a satellite signal and a program tracking mode controlling attitude of the antenna 3 based on the orbit prediction value. During the automatic tracking mode, the operational processor 13 outputs to the switching section 17 an angle error signal $\Delta X$ output from the tracking receiver 12, an output of the coordinate converter 14 and an output of the AZ command operator 15. During the program tracking mode, the operational processor 13 outputs an output of the program operator 16 to the switching section 17. Based on a signal from the determiner 22, the switching section 17 switches between the two-axis control to drive the AZ axis 4 and the EL axis 5 and the three-axis control to drive the AZ axis 4, the EL axis 5 and the xEL axis 6.

FIG. 1 illustrates the tracking system 1 in automatic tracking mode performing three-axis control. When the tracking system 1 in the automatic tracking mode performs three-axis control, an output of the AZ command operator 15 is supplied to the AZ servo operator 20, and the AZ servo operator 20 supplies motor drive power to the AZ driver 33 and drives and controls the AZ axis 4 so that the AZ angle has no error. The coordinate converter 14 performs coordinate conversion of the angle error signals $\Delta X$ and $\Delta Y$ and outputs an error of the EL angle, which is supplied to the EL servo operator 19, and the EL servo operator 19 supplies motor drive power to the EL driver 32 and drives and controls the EL axis 5, so that the EL angle has no error. The angle error signal $\Delta X$ is supplied to the xEL servo operator 18, and the xEL servo operator 18 supplies motor drive power to the xEL driver 31 and drives and controls the xEL axis 6, so that the xEL angle has no error. When the tracking system 1 in the automatic tracking mode performs two-axis control, an output of the coordinate converter 14 is supplied to the AZ servo operator 20 and the EL servo operator 19. The AZ servo operator 20 and the EL servo operator 19 drive and control the AZ axis 4 and the EL axis 5, respectively, so that the AZ angle and the EL angle have no error.

When the tracking system 1 in the program tracking mode performs three-axis control, error amounts of the AZ angle, the EL angle and the xEL angle, in case of three-axis control, output from the program operator 16, are supplied to the AZ servo operator 20, the EL servo operator 19 and the xEL servo operator 18, respectively. The AZ servo operator 20, the EL servo operator 19 and the xEL servo operator 18 drive and control the AZ axis 4, the EL axis 5 and the xEL axis 6 so that the AZ angle, EL angle and the xEL angle have no error. When the tracking system 1 in the program tracking mode performs two-axis control, the error amounts of the AZ angle and the EL angle, in case of two-axis control, output from the program operator 16, are supplied to the AZ servo operator 20 and the EL servo operator 19. The AZ servo operator 20 and the EL servo operator 19 drive and control the AZ axis 4 and the EL axis 5, respectively, so that the AZ angle and the EL angle have no error.

Figure 4:
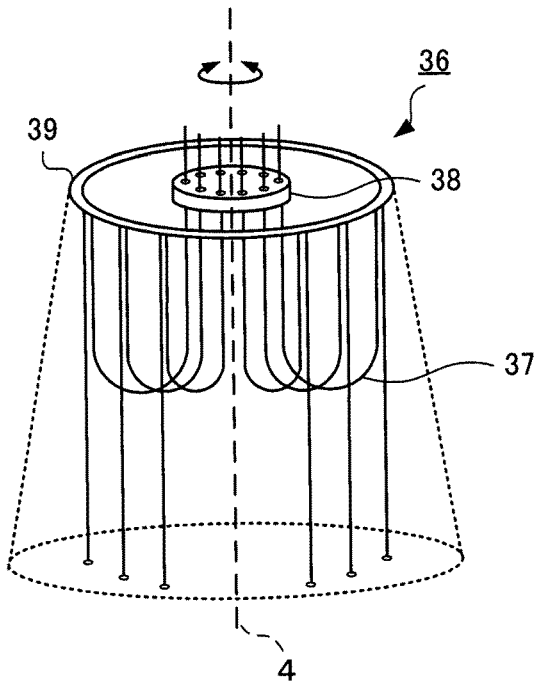
FIG. 4 is a perspective drawing of a cable winding mechanism according to the first embodiment.
Figure 5:
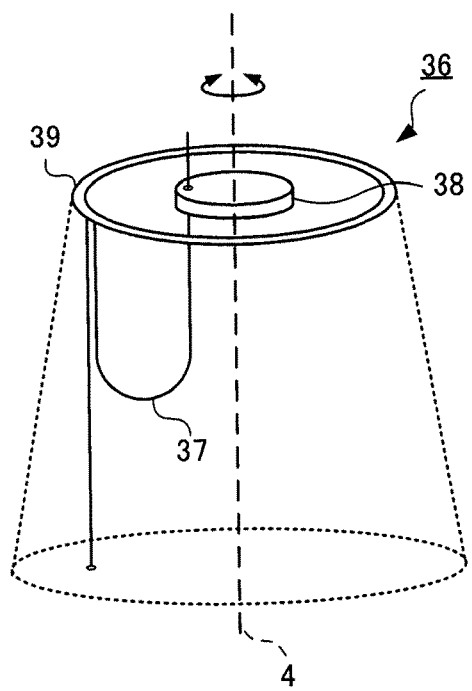
FIG. 5 is a perspective drawing of the cable winding mechanism according to the first embodiment.

FIG. 4 is a perspective drawing of a cable winding mechanism according to the first embodiment. The side of the housing of a cable winding mechanism 36 is indicated by dashed lines. Cable 37 to send power or a signal is bent in a U-shaped. The ends of the U-shaped cables are fixed to a rotor 38 and a fixed portion 39. The rotor 38 rotates against the fixed portion 39, around the AZ axis 4 as illustrated by an arrow. FIG. 5 is a perspective drawing of the cable winding mechanism according to the first embodiment. For easier understanding, only one cable 37 is shown.

Figure 6:
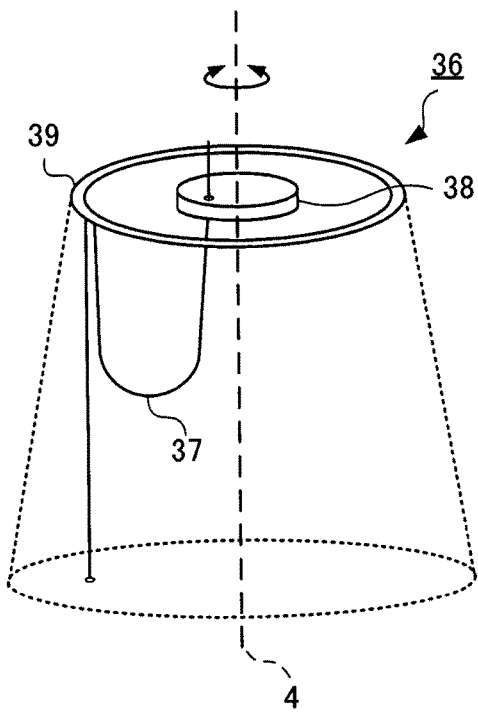
FIG. 6 is a perspective drawing of the cable winding mechanism according to the first embodiment in which an AZ axis is rotated by 45 degrees.
Figure 7:
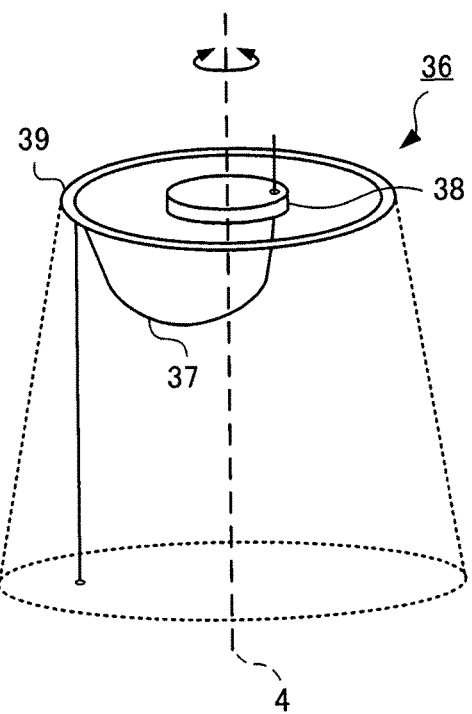
FIG. 7 is a perspective drawing of the cable winding mechanism according to the first embodiment in which the AZ axis is rotated by 180 degrees.
Figure 8:
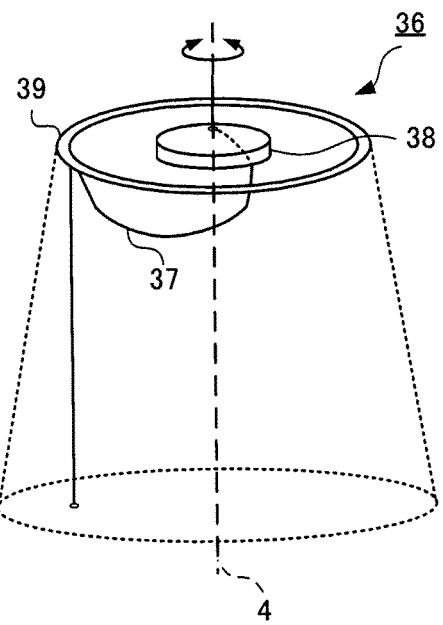
FIG. 8 is a perspective drawing of the cable winding mechanism according to the first embodiment in which the AZ axis is rotated by 270 degrees.

FIG. 6 is a perspective drawing of the cable winding mechanism according to the first embodiment in which the AZ axis is rotated by 45 degrees. FIG. 7 is a perspective drawing of the cable winding mechanism according to the first embodiment in which the AZ axis is rotated by 180 degrees. FIG. 8 is a perspective drawing of the cable winding mechanism according to the first embodiment in which the AZ axis is rotated by 270 degrees. FIGS. 6 to 8 illustrate a state in which the rotor 38 of the cable winding mechanism 36 illustrated in FIG. 5 is rotated in the arrow direction. As the rotor 38 of the cable winding mechanism 36 illustrated in FIG. 5 rotates, the cable 37 gets twisted. Depending on slack of the cable 37, the cable can be rotated around the AZ axis 4 to a certain angle. However, rewinding of the cable 37 is required when exceeding a certain angle.

Figure 9:
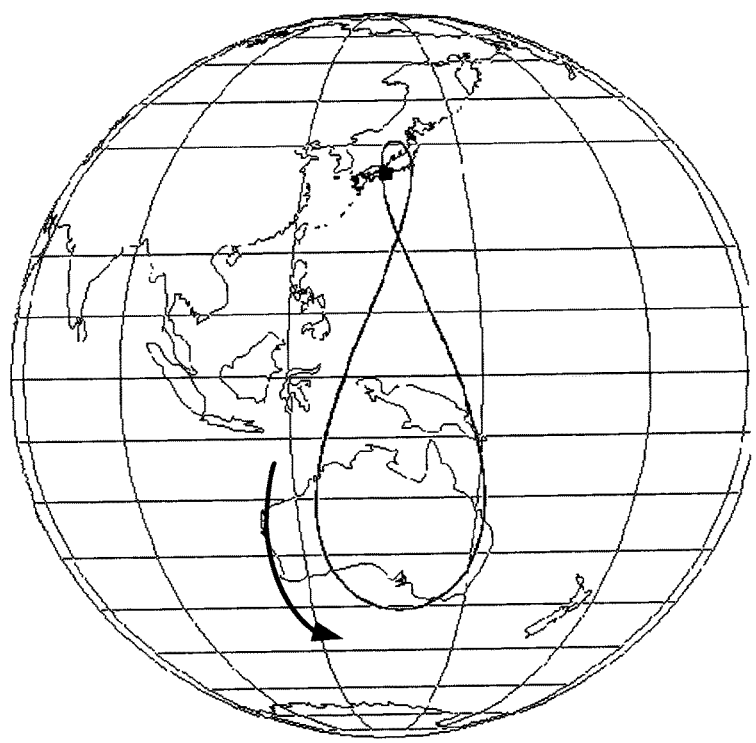
FIG. 9 is a drawing illustrating an example of a satellite orbit according to the first embodiment.

FIG. 9 is a drawing illustrating an example of a satellite orbit according to the first embodiment. The solid line of FIG. 9 illustrates a satellite orbit, and the black square illustrates a position of the antenna 3. In an example in FIG. 9, the satellite orbits in a quasi-zenith orbit in the arrow direction. For example, a case in which the zenith of the antenna 3 is positioned inside the quasi-zenith orbit is explained as illustrated in FIG. 9. While the satellite travels one round of an orbit, when the AZ axis 4 and the EL axis 5 of the antenna 3 are driven and the beam direction 7 of the antenna 3 is controlled to track the satellite, the AZ angle of the antenna 3 rotates by 360 degrees.

Figure 10:
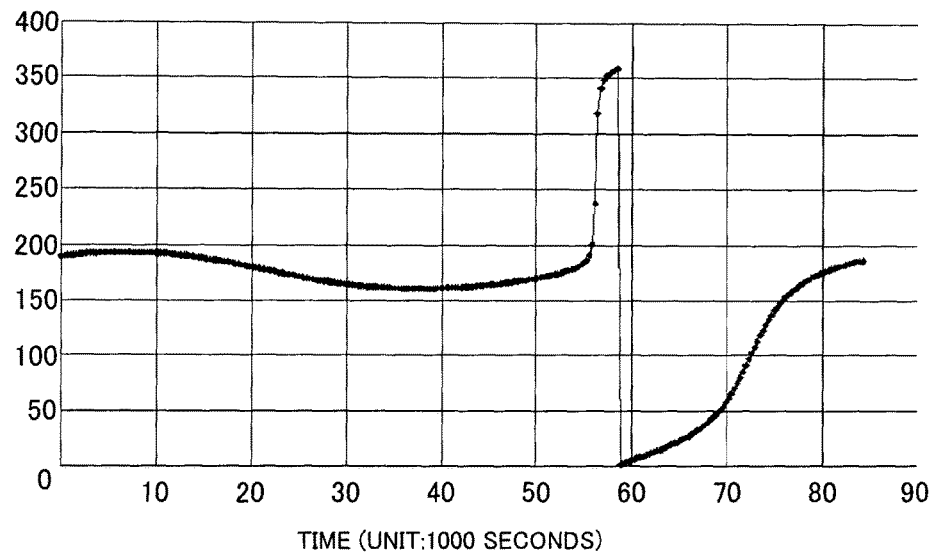
FIG. 10 is a drawing illustrating an example of a rotation of an AZ angle.
Figure 11:
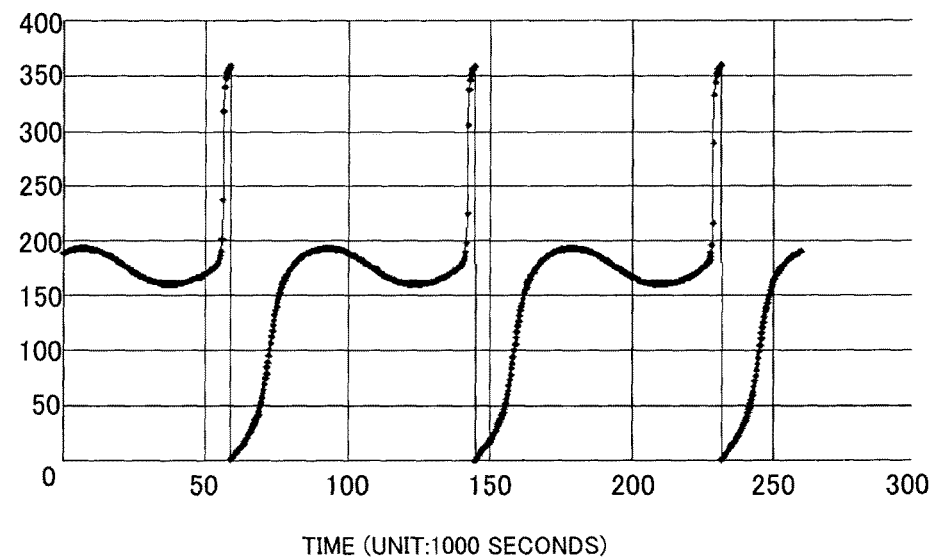
FIG. 11 is a drawing illustrating an example of a rotation of the AZ angle.
Figure 14:
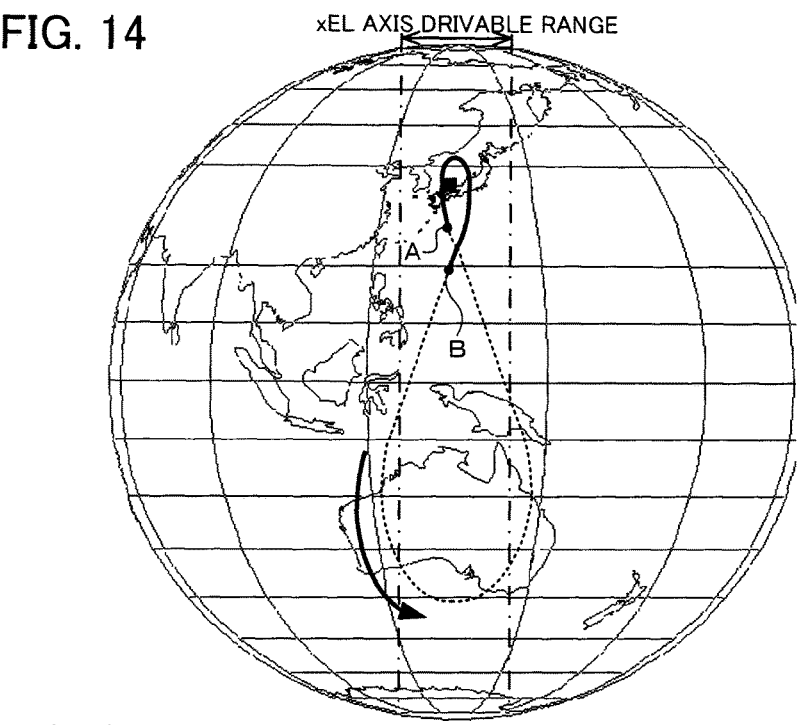
FIG. 14 is a drawing illustrating an example of a positional relationship between the antenna and the satellite orbit according to the first embodiment.
Figure 15:
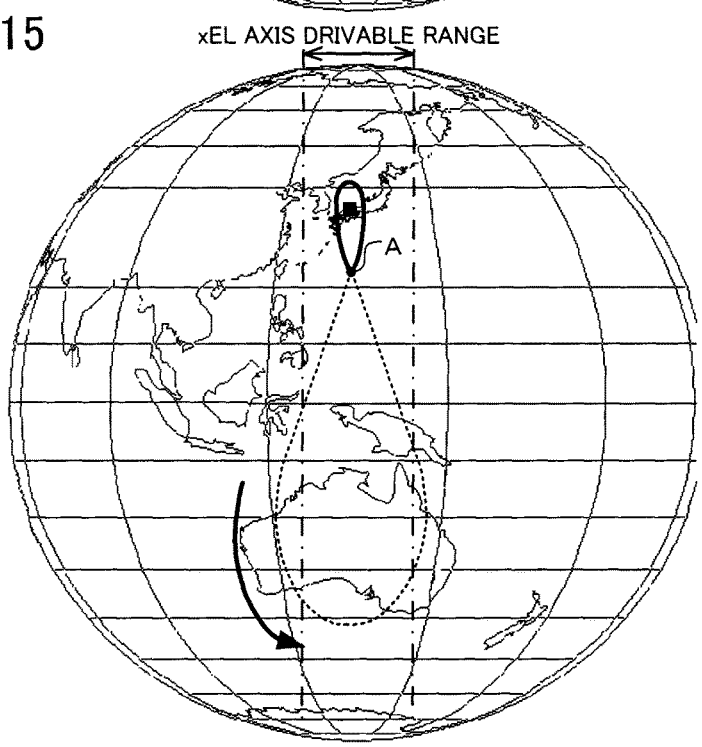
FIG. 15 is a drawing illustrating an example of a positional relationship between the antenna and the satellite orbit according to the first embodiment.
Figure 16:
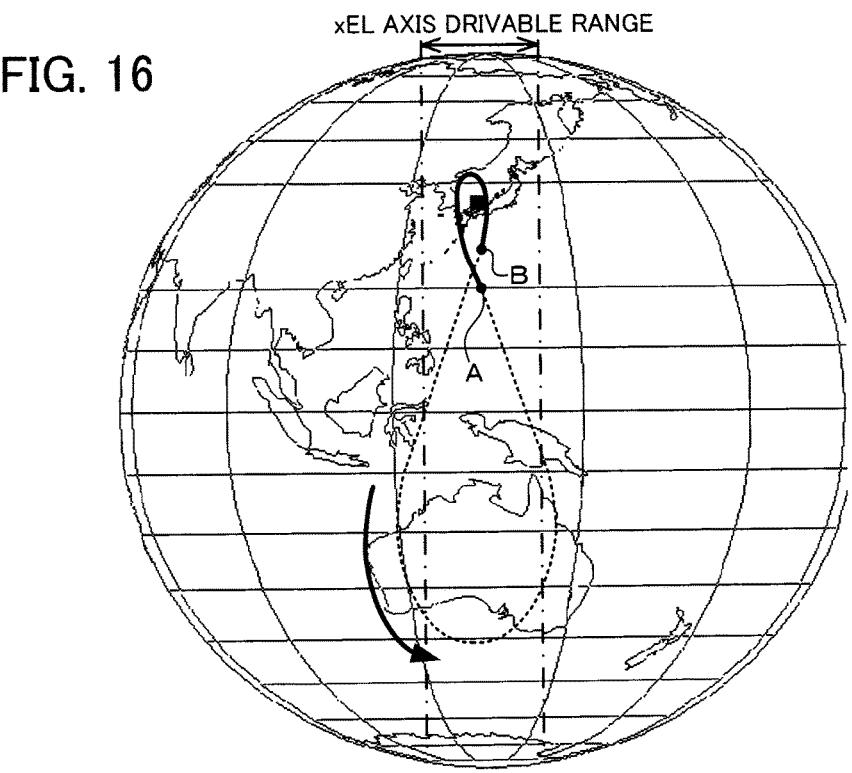
FIG. 16 is a drawing illustrating an example of a positional relationship between the antenna and the satellite orbit according to the first embodiment.
Figure 17:
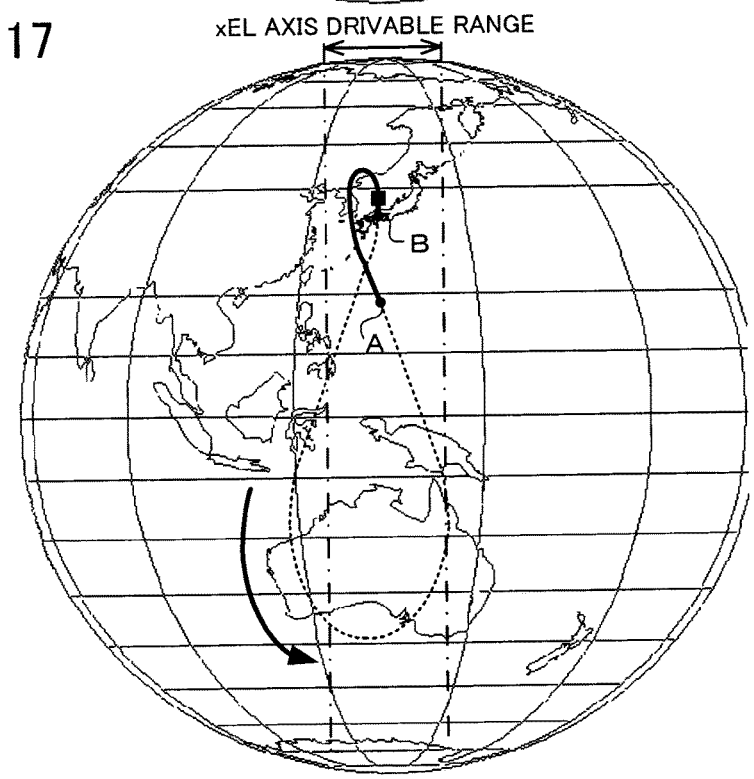
FIG. 17 is a drawing illustrating an example of a positional relationship between the antenna and the satellite orbit according to the first embodiment.

FIG. 10 and FIG. 11 are drawings illustrating examples of rotations of the AZ angle. The horizontal axis of the graph represents the time (unit: 1,000 seconds), and the vertical axis represents the AZ angle (unit: degree). AZ angle when the antenna 3 is directed to due north is defined to be zero degrees, and AZ angle when the antenna 3 is directed to due south is defined to be 180 degrees. Taking a case in which the antenna 3 is positioned at 35 degrees north latitude, and 135 degrees east longitude as an example, changes of the AZ angle from a time when the AZ angle of the antenna 3 is 189 degrees are illustrated. FIG. 10 illustrates changes of the AZ angle when the satellite travels one round of the quasi-zenith orbit, and FIG. 11 illustrates changes of the AZ angle when the satellite travels three rounds of the quasi-zenith orbit. Using the cable winding mechanism 36 illustrated in FIG. 4, when the AZ axis 4 and the EL axis 5 of the antenna 3 are driven and the beam direction 7 of the antenna 3 is controlled to track the satellite, as illustrated in FIG. 10 and FIG. 11, the AZ angle rotates 360 degrees or more and rewinding of the cable 37 is required. In a case in that rewinding of the cable 37 is required, one antenna 3 cannot communicate with one satellite at all times.

When the AZ angle of the antenna 3 tracking a satellite rotates beyond a predetermined rotation range within a predetermined duration of time,
while an estimated position of the satellite is within a drivable range in which the AZ angle of the antenna 3 tracking the satellite rotates from a reference value beyond the rotation range, and
in which the xEL axis 6 can be driven in a state in which the AZ angle is set to a predetermined value that is permissible for the AZ angle,
the tracking system 1 according to the first embodiment drives the EL axis 5 and the xEL axis 6 and controls the beam direction 7 of the antenna 3 to track the satellite in a state in which the AZ angle is set to the predetermined value. Therefore rewinding of the cable 37 is not required, and this enables one antenna 3 to communicate with one satellite at all times.

In addition, when an AZ angle of the antenna 3 tracking a satellite rotates beyond the rotation range within the predetermined duration of time, and
while the estimated position of the satellite is not within the above-mentioned drivable range; or when an AZ angle of the antenna 3 tracking a satellite does not rotate beyond the rotation range within the predetermined duration of time;
the tracking system 1 drives the AZ axis 4 and the EL axis 5 and controls the beam direction 7 of the antenna 3 to track the satellite. The estimated position of the satellite is a position of the satellite estimated based on an orbit prediction value or orbit information of the satellite and the beam direction 7 of the antenna 3. The orbit information of the satellite includes the latitude, longitude and altitude at each point of the orbit traveled by the satellite. The rotation range and the reference value can be determined arbitrarily based on a positional relationship between the antenna 3 and the satellite orbit, structure of the antenna 3, a length of the cable 37, and the like.

The rotation determiner 23 included in the determiner 22 determines whether the AZ angle of the antenna 3 tracking the satellite rotates beyond the rotation range within the predetermined duration of time based on an orbit prediction value.

When the rotation determiner 23 determines that the AZ angle of the antenna 3 rotates beyond the rotation range, an orbit determiner 24 included in the determiner 22 determines whether the estimated position of the satellite is within a drivable range in which the AZ angle of the antenna 3 rotates from the reference value beyond the rotation range, and in which the xEL axis 6 can be driven in a state in which the AZ angle is set to the predetermined value that is permissible for the AZ angle.

In a case in that the AZ angle of the antenna 3 rotates beyond the rotation range within the predetermined duration of time, while the estimated position of the satellite is within the above-mentioned drivable range, the determiner 22 sends a command to the switching section 17 to cause performance of three-axis control, and sends a command to cause the AZ command operator 15 to output a command value that keeps the AZ angle at a predetermined value. The predetermined value can be set arbitrarily. In addition, when the AZ angle of the antenna 3 rotates beyond the rotation range within the predetermined duration of time and while the estimated position of the satellite is not within the above-mentioned drivable range, or when the AZ angle of the antenna 3 does not rotate beyond the rotation range, the determiner 22 sends a command to the switching section 17 to cause the performance of two-axis control.

In addition, when the AZ angle of the antenna 3 rotates beyond the rotation range within the predetermined duration of time and the estimated position of the satellite enters the above-mentioned drivable range, the determiner 22 may send a command to a brake system and the AZ axis 4 of the antenna 3 may be held by the brake system. Then, when the estimated position of the satellite departs from the above range, the determiner 22 sends a command to the brake system and releases the brake.

The switching section 17 switches between two-axis control and three-axis control according to a command from the determiner 22. The AZ command operator 15 outputs a command value that keeps the AZ angle of the antenna 3 at a predetermined value according to a command from the determiner 22.

An example is explained in which a satellite travels one round of a quasi-zenith orbit in one day. The rotation determiner 23 determines whether the AZ angle of the antenna 3 rotates 360 degrees or more in one day. FIG. 12 is a drawing illustrating an example of a positional relationship between the antenna and the satellite orbit according to the first embodiment. The dashed line in FIG. 12 illustrates the satellite orbit and the black square illustrates the position of the antenna 3. The satellite orbits in the quasi-zenith orbit in the arrow direction. When the zenith of the antenna 3 is outside the quasi-zenith orbit as illustrated in FIG. 12, the rotation determiner 23 determines that the AZ angle of the antenna 3 does not rotate 360 degrees or more in one day, and the determiner 22 sends a command to the switching section 17 to cause performance of two-axis control based on the AZ axis 4 and the EL axis 5. In the example in FIG. 12, the tracking system 1 drives the AZ axis 4 and the EL axis 5, and controls the beam direction 7 of the antenna 3 to track the satellite.

FIG. 13 is a drawing illustrating an example of the positional relationship between the antenna and the satellite orbit according to the first embodiment. The solid line and the dashed line in FIG. 13 illustrate the satellite orbit, and the black square illustrates the position of the antenna 3. The satellite orbits in the quasi-zenith orbit in the arrow direction. When the quasi-zenith orbit is positioned at the zenith of the antenna 3, the rotation determiner 23 determines that the AZ angle of the antenna 3 rotates 360 degrees or more in one day. The AZ angle at the times when the antenna 3 is directed to A and when the antenna 3 is directed to B is 180 degrees. In FIG. 13, a range surrounded by a dot-and-dash line is a range in which the xEL axis 6 can be driven in a state in which the AZ angle is set to 180 degrees. In a range from point A to point B indicated by the solid line in FIG. 13, the AZ angle of the antenna 3 rotates 360 degrees from 180 degrees, which is the reference value, and the xEL axis 6 can be driven in the range. As the rotation determiner 23 determines that the AZ angle of the antenna 3 rotates 360 degrees or more in one day, the orbit determiner 24 determines whether the estimated position of the satellite is within a range from point A to point B by the solid line illustrated in FIG. 13.

While the estimated position of the satellite is within the range from point A to point B indicated by the solid line in FIG. 13, the determiner 22 sends a command to the switching section 17 to cause performance of three-axis control, and sends a command to cause the AZ command operator 15 to output a command value that keeps the AZ angle of the antenna 3 at a predetermined value. 180 degrees are used in the example in FIG. 13 as the predetermined value. In addition, while the estimated position of the satellite is in the range indicated by the dashed line illustrated in FIG. 13, the determiner 22 sends a command to the switching section 17 to cause performance of two-axis control.

By the above-mentioned process, in the example in FIG. 13, while the estimated position of the satellite is in the range indicated by the solid line illustrated in FIG. 13, the tracking system 1 drives the EL axis 5 and the xEL axis 6 in a state in which the AZ angle is set to the predetermined value, and controls the beam direction 7 of the antenna 3 to track the satellite, and while the estimated position of the satellite is in the range indicated by the dashed line illustrated in FIG. 13, the tracking system 1 drives the AZ axis 4 and the EL axis 5, and controls the beam direction 7 of the antenna 3 to track the satellite.

FIGS. 14 to 18 are drawings illustrating examples of positional relationships between the antenna and the satellite orbit according to the first embodiment. The viewpoints of the drawings are similar to FIG. 13, and the zenith of the antenna 3 is positioned in the inside of the quasi-zenith orbit in FIGS. 14 to 16. In addition, in FIG. 17, the quasi-zenith orbit is positioned at the zenith of the antenna 3. In FIGS. 14 to 17, the AZ angle of the antenna 3 rotates 360 degrees or more in one day. Therefore, similar to FIG. 13, while the estimated position of the satellite is in the range from point A to point B or point A to point A again indicated by the solid line, the tracking system 1 drives the EL axis 5 and the xEL axis 6 in a state in which the AZ angle is set to the predetermined value, and controls the beam direction 7 of the antenna 3 to track the satellite, and while the estimated position of the satellite is in the range indicated by the dotted line, the tracking system 1 drives the AZ axis 4 and the EL axis 5, and controls the beam direction 7 of the antenna 3 to track the satellite. In case of FIG. 18, the zenith of the antenna 3 is outside the quasi-zenith orbit, and the AZ angle of the antenna 3 does not rotate 360 degrees or more in one day. Therefore, similar to FIG. 12, the tracking system 1 drives the AZ axis 4 and the EL axis 5, and controls the beam direction 7 of the antenna 3 to track the satellite.

Figure 19:
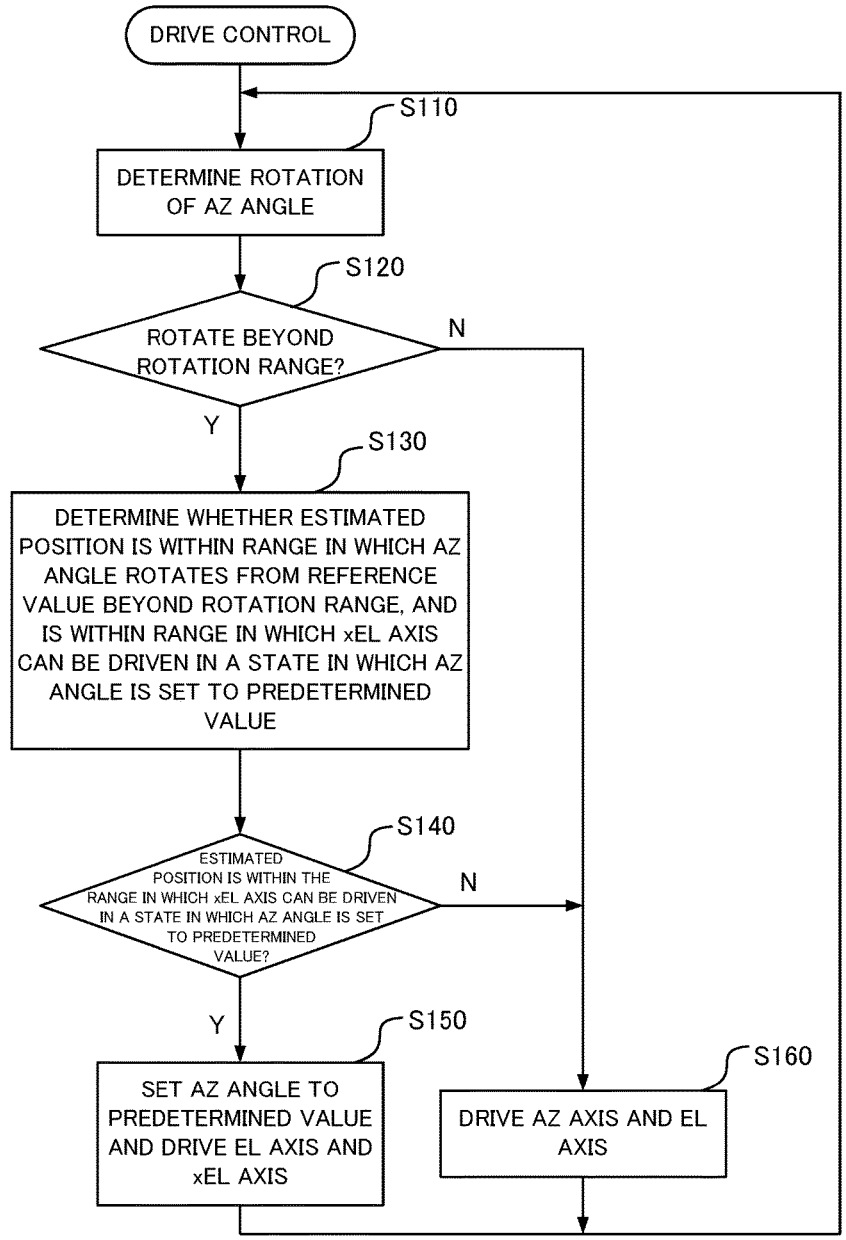
FIG. 19 is a flow chart illustrating an example of a driving and controlling operation performed by the tracking system according to the first embodiment.

FIG. 19 is a flow chart illustrating an example of the drive and control operation performed by the tracking system according to the first embodiment. The rotation determiner 23 determines, based on the orbit prediction value, whether the AZ angle of the antenna 3 rotates beyond the rotation range within the predetermined duration of time (step S110). When the rotation determiner 23 determines that the AZ angle of the antenna 3 rotates beyond the rotation range (step S120; Y), the orbit determiner 24 determines whether the estimated position of the satellite is within a range in which the AZ angle of the antenna 3 rotates from the reference value beyond the rotation range, and the estimated position is within the drivable range in which the xEL axis 6 can be driven in a state in which the AZ angle is set to a predetermined value (step S130).

When the orbit determiner 24 determines that the estimated position of the satellite is within the above-mentioned drivable range (step S140; Y), the tracking system 1 drives the EL axis 5 and the xEL axis 6 in a state in which the AZ angle is set to the predetermined value by the AZ command operator 15, and controls the beam direction 7 of the antenna 3 to track the satellite (step S150). When the orbit determiner 24 determines that the AZ angle of the antenna 3 does not rotate beyond the rotation range (step S120; N), or when the rotation determiner 23 determines that the AZ angle of the antenna 3 rotates beyond the rotation range and the orbit determiner 24 determines that the estimated position of the satellite is not it in the above-mentioned drivable range (step S120; Y, step S140; N), the tracking system 1 drives the AZ axis 4 and the EL axis 5 and controls the beam direction 7 of the antenna 3 to track the satellite (step S160). The tracking system 1 performs the above-mentioned processes repeatedly.

As described above, according to the tracking system 1 of the first embodiment, while the estimated position of the satellite is within a drivable range in which the AZ angle of the antenna 3 tracking the satellite rotates from the reference value beyond the rotation range, and in which the xEL axis 6 can be driven in a state in which the AZ angle is set to the predetermined value, the tracking system 1 can track a target without rewinding the cable 37 by setting the AZ angle the predetermined value and driving the EL axis 5 and the xEL axis 6.

Second Embodiment

The configuration of a tracking system 1 according to a second embodiment is the same as the configuration of the tracking system 1 according to the first embodiment illustrated in FIG. 1. Explanation is provided for operations of each part of the tracking system 1 according to the second embodiment that are different from the first embodiment.

In the second embodiment, a satellite orbits in an orbit having an intersection point. When an AZ angle of an antenna 3 tracking the satellite rotates beyond a rotation range within a predetermined duration of time, while the estimated position of the satellite is within a drivable range starting from an intersection point of a satellite orbit reaching the intersection point again, and in which an xEL axis 6 can be driven in a state in which the AZ angle is an AZ angle at the time when the antenna 3 is directed to the intersection point, the tracking system 1 drives an EL axis 5 and the xEL axis 6 in a state in which the AZ angle is an AZ angle at the time when the antenna 3 is directed to the intersection point, and controls a beam direction 7 of the antenna 3 to track the satellite. Therefore rewinding of a cable 37 is not required, and this enables one antenna 3 to communicate with a satellite at all times. The AZ angle at the time when the antenna 3 is directed to the intersection point is calculated based on an orbit prediction value or latitude and longitude of the antenna 3 and orbit information of the satellite. In addition, similar to the first embodiment, when the AZ angle of the antenna 3 tracking the satellite rotates beyond the rotation range within the predetermined duration of time and while the estimated position of the satellite is not in the above-mentioned drivable range or when the AZ angle of the antenna 3 tracking the satellite does not rotate beyond the rotation range within the predetermined duration of time, the tracking system 1 drives the AZ axis 4 and the EL axis 5, and controls the beam direction 7 of the antenna 3 to track the satellite.

Similar to the first embodiment, a rotation determiner 23 determines based on an orbit prediction value whether the AZ angle of the antenna 3 rotates beyond the rotation range within the predetermined duration of time. When the rotation determiner 23 determines that the AZ angle of the antenna 3 rotates beyond the rotation range, an orbit determiner 24 determines whether the estimated position of the satellite is in a drivable range starting from an intersection point of a satellite orbit reaching the intersection point again, and in which the xEL axis 6 can be driven in a state in which the AZ angle is set to an AZ angle at the time when the antenna 3 is directed to the intersection point. When the AZ angle of the antenna 3 rotates beyond the rotation range within the predetermined duration of time while the estimated position of the satellite is within the above-mentioned drivable range, a determiner 22 sends a command to the switching section 17 to cause performance of three-axis control, and sends a command to cause the AZ command operator 15 to output a command value that keeps the AZ angle at a predetermined value. In addition, when the AZ angle of the antenna 3 rotates beyond the rotation range within the predetermined duration of time and while the estimated position of the satellite is not within the above-mentioned drivable range, or when the AZ angle of the antenna 3 does not rotate beyond the rotation range, the determiner 22 sends a command to the switching section 17 to cause performance of two-axis control.

Figure 18:
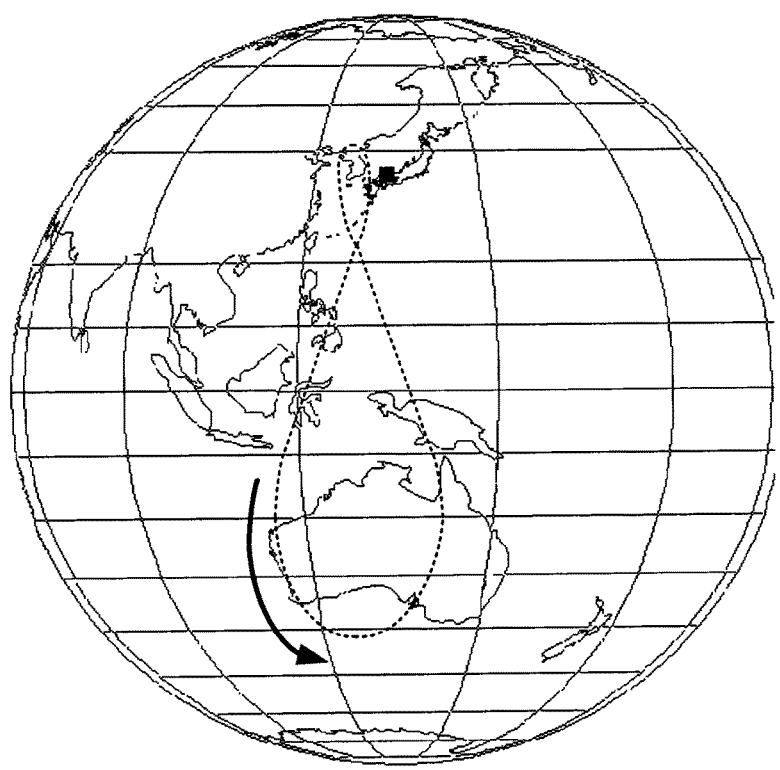
FIG. 18 is a drawing illustrating an example of a positional relationship between the antenna and the satellite orbit according to the first embodiment.
Figure 20:
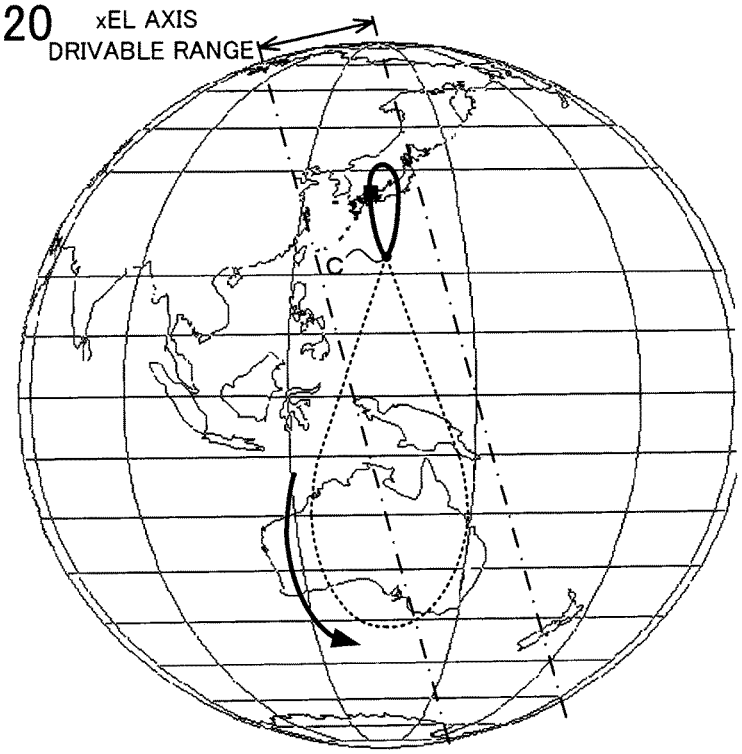
FIG. 20 is a drawing illustrating an example of a positional relationship between an antenna and a satellite orbit according to a second embodiment of the present disclosure.

An example is explained in which a satellite travels one round of a quasi-zenith orbit in one day. As illustrated in FIG. 12 or FIG. 18, when the zenith of the antenna 3 is outside the quasi-zenith orbit, operation is similar to the first embodiment. FIG. 20 is a drawing illustrating an example of a positional relationship between an antenna and a satellite orbit according to the second embodiment of the present disclosure. The solid line and dashed line in FIG. 20 illustrate the satellite orbit and the black square illustrates a position of the antenna 3. The satellite travels through the quasi-zenith orbit in the arrow direction. When the quasi-zenith orbit is positioned at the zenith of the antenna 3, the rotation determiner 23 determines that the AZ angle of the antenna 3 rotates 360 degrees or more in one day. In FIG. 20, a range surrounded by a dot-and-dash line is a range in which the xEL axis 6 can be driven in a state in which the AZ angle is set to an AZ angle at the time when the antenna 3 is directed to an intersection point C. In the orbit indicated by the solid line starting from the intersection point C reaching to the intersection point C again illustrated in FIG. 20, the AZ angle of the antenna 3 rotates 360 degrees, and the xEL axis 6 can be driven. Because the rotation determiner 23 determines that the AZ angle of the antenna 3 rotates 360 degrees or more in one day, the orbit determiner 24 determines whether the estimated position of the satellite is in the range indicated by the solid line illustrated in FIG. 20.

While the estimated position of the satellite is within a range indicated by the solid line illustrated in FIG. 20, the determiner 22 sends a command to the switching section 17 to cause performance of three-axis control, and sends a command to cause the AZ command operator 15 to output a command value that keeps the AZ angle of the antenna 3 at a predetermined value. The AZ command operator 15 provided in the tracking system 1 according to the second embodiment uses an AZ angle at the time when the antenna 3 is directed to the intersection point C as the predetermined value. In addition, the determiner 22 sends a command to the switching section 17 to cause performance of two-axis control while the estimated position of the satellite is in the range indicated by the dotted line illustrated in FIG. 20.

By the above-mentioned process, in the example in FIG. 20, while the estimated position of the satellite is in the range indicated by the solid line illustrated in FIG. 20, the tracking system 1 drives the EL axis 5 and the xEL axis 6 in a state in which the AZ angle is set to an AZ angle at the time when the antenna 3 is directed to the intersection point C, and controls the beam direction 7 of the antenna 3 to track the satellite. While the estimated position of the satellite is in the range indicated by the dashed line illustrated in FIG. 20, the tracking system 1 drives the AZ axis 4 and the EL axis 5, and controls the beam direction 7 of the antenna 3 to track the satellite.

Figure 21:
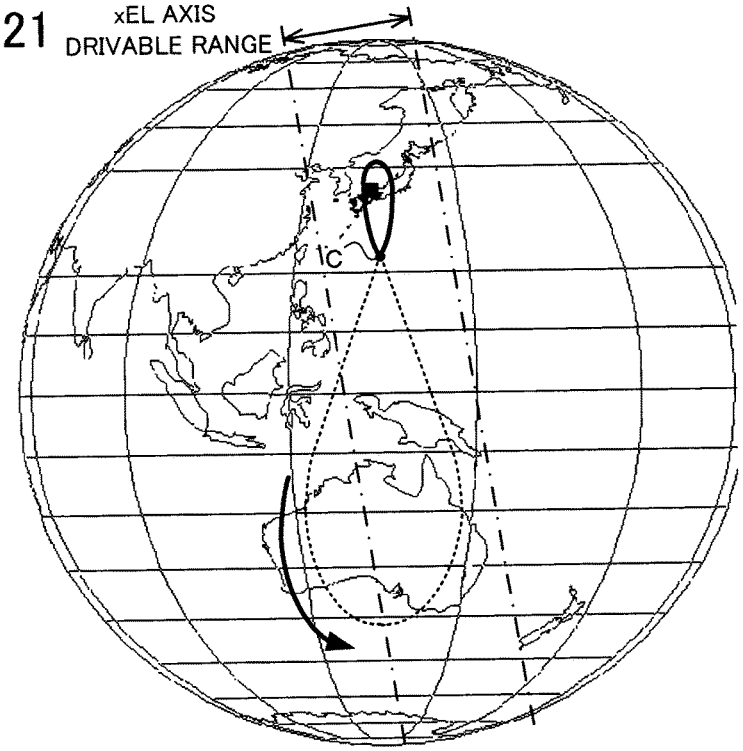
FIG. 21 is a drawing illustrating an example of a positional relationship between the antenna and the satellite orbit according to the second embodiment.
Figure 22:
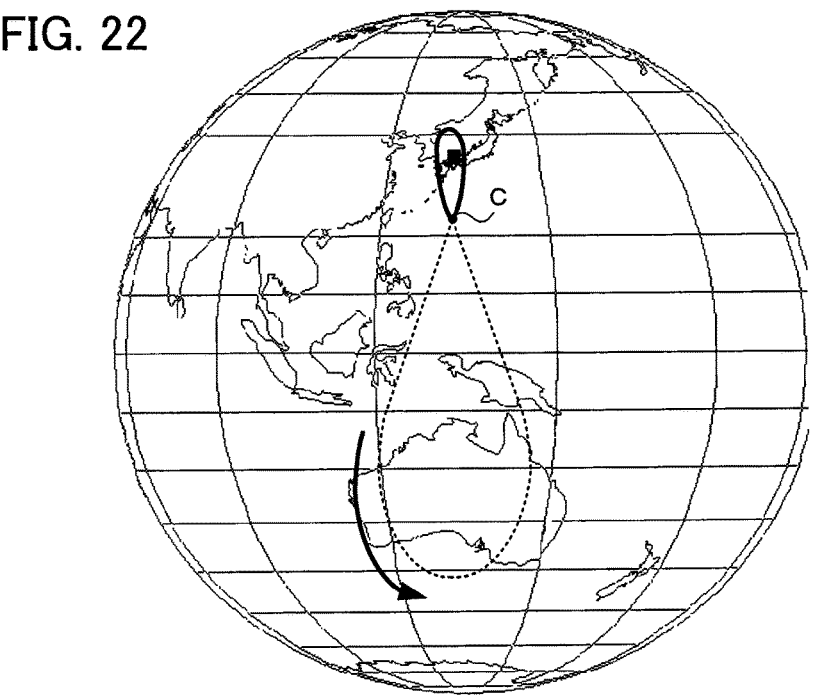
FIG. 22 is a drawing illustrating an example of a positional relationship between the antenna and the satellite orbit according to the second embodiment.
Figure 23:
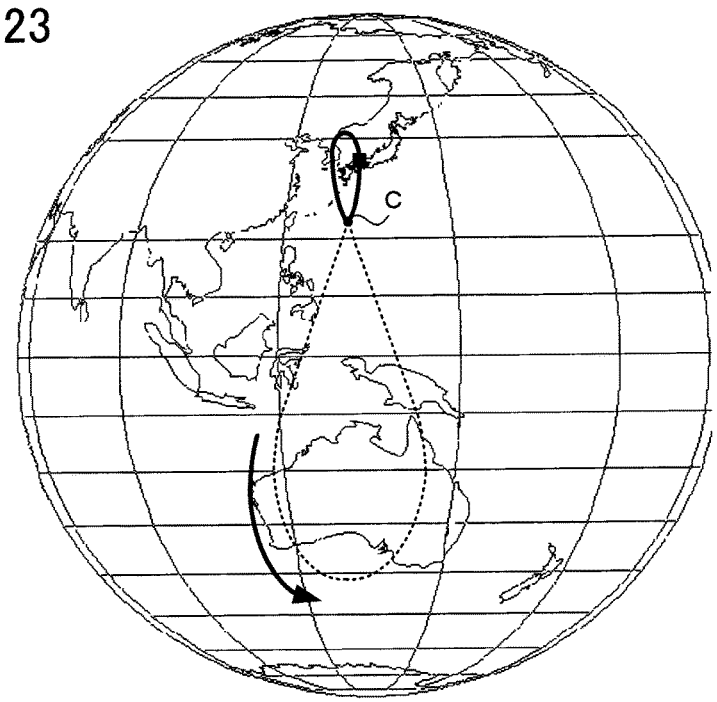
FIG. 23 is a drawing illustrating an example of a positional relationship between the antenna and the satellite orbit according to the second embodiment.

FIGS. 21 to 23 are drawings illustrating examples of positional relationships between the antenna and the satellite orbit according to the second embodiment. The viewpoints of the drawings are similar to FIG. 20. The zenith of the antenna 3 is positioned in the inside of the quasi-zenith orbit in FIG. 21 and FIG. 22. In addition, in FIG. 23, the quasi-zenith orbit is positioned at the zenith of the antenna 3. In FIGS. 21 to 23, the AZ angle of the antenna 3 rotates 360 degrees or more in one day. Therefore, similar to FIG. 20, while the estimated position of the satellite is in a range starting from the intersection point C reaching to the intersection point C again, the range being indicated by the solid line, the tracking system 1 drives the EL axis 5 and the xEL axis 6 in a state in which the AZ angle is set to the AZ angle at the time when the antenna 3 is directed to the intersection point C, and controls the beam direction 7 of the antenna 3 to track the satellite, and while the estimated position of the satellite is in the range indicated by the dotted line, the tracking system 1 drives the AZ axis 4 and the EL axis 5, and controls the beam direction 7 of the antenna 3 to track the satellite.

Driving and controlling operations performed by the tracking system 1 according to the second embodiment are the same as operations performed by the tracking system 1 according to the first embodiment illustrated in FIG. 19.

However, in step S150, the AZ angle is set to an AZ angle at the time when the antenna 3 is directed to the intersection point C.

As described above, according to the tracking system 1 of the second embodiment, while the estimated position of the satellite is within a range starting from the intersection point of the satellite orbit reaching to the intersection point again, and the estimated position of the satellite is within a range in which the xEL axis 6 can be driven in a state in which the AZ angle is set to an AZ angle at the time when the antenna 3 is directed to the intersection point, the tracking system 1 can track a target without rewinding the cable 37, by setting the AZ angle to the AZ angle at the time when the antenna 3 is directed to the intersection point and driving the EL axis 5 and the xEL axis 6.

Third Embodiment

The configuration of a tracking system 1 according to a third embodiment is the same as the configuration of the tracking system 1 according to the first embodiment illustrated in FIG. 1. Explanation is provided for operations of each part of the tracking system 1 according to the third embodiment that are different from the first embodiment.

When an AZ angle of an antenna 3 tracking a satellite rotates beyond a rotation range within a predetermined duration of time,
while the estimated position of the satellite is not within a range in which the AZ angle of the antenna 3 tracking a satellite rotates from a reference value beyond the rotation range, and
while the estimated position of the satellite is within a range in which an xEL axis 6 can be driven in a state in which the AZ angle is set to a predetermined value that is permissible for the AZ angle in the above range,
the tracking system 1 according to the third embodiment drives an EL axis 5 and the xEL axis 6 in a state in which the AZ angle is set to the predetermined value, and controls a beam direction 7 of the antenna 3 to track the satellite. In addition, in a case in that the AZ angle of the antenna 3 tracking the satellite does not rotate beyond the rotation range within the predetermined duration of time, while the estimated position of the satellite is in a range in which the xEL axis 6 can be driven in a state in which the AZ angle is set to the predetermined value that is permissible for the AZ angle of the antenna 3 tracking the satellite,
the tracking system 1 according to the third embodiment drives the EL axis 5 and the xEL axis 6 in a state in which the AZ angle is set to the predetermined value, and controls the beam direction 7 of the antenna 3 to track the satellite. In other words, compared with the first and the second embodiments, in the third embodiment, the three-axis control that drives the AZ axis 4, the EL axis 5 and the xEL axis 6 can be performed in a wider range.

Similar to the first embodiment, the rotation determiner 23 determines, based on an orbit prediction value, whether the AZ angle of the antenna 3 rotates beyond the rotation range within the predetermined duration of time. When the rotation determiner 23 determines that the AZ angle of the antenna 3 rotates beyond the rotation range, the orbit determiner 24 determines whether the estimated position of the satellite is in a drivable range in which the AZ angle of the antenna 3 rotates from the reference value beyond the rotation range, and in which the xEL axis 6 can be driven in a state in which the AZ angle is set to a predetermined value that is permissible for the AZ angle. When the AZ angle of the antenna 3 rotates beyond the rotation range within the predetermined duration of time, and while the estimated position of the satellite is within the above-mentioned drivable range, the determiner 22 sends a command to the switching section 17 to cause performance of three-axis control, and sends a command to cause the AZ command operator 15 to output a command value that keeps the AZ angle of the antenna 3 at the predetermined value.

In addition, when the AZ angle of the antenna 3 rotates beyond the rotation range within the predetermined duration of time, and while the estimated position of the satellite is not within the above-mentioned drivable range and the estimated position of the satellite is in a range in which the xEL axis 6 can be driven in a state in which the AZ angle is set to the above-mentioned predetermined value, or
when the AZ angle of the antenna 3 does not rotate beyond the rotation range, and while the estimated position of the satellite is in a range in which the xEL axis 6 can be driven in a state in which the AZ angle is set to the predetermined value that is permissible for the AZ angle,
the determiner 22 sends a command to the switching section 17 to cause performance of three-axis control,
and in conditions other than the above conditions, the determiner 22 sends a command to the switching section 17 to cause performance of two-axis control.

Figure 24:
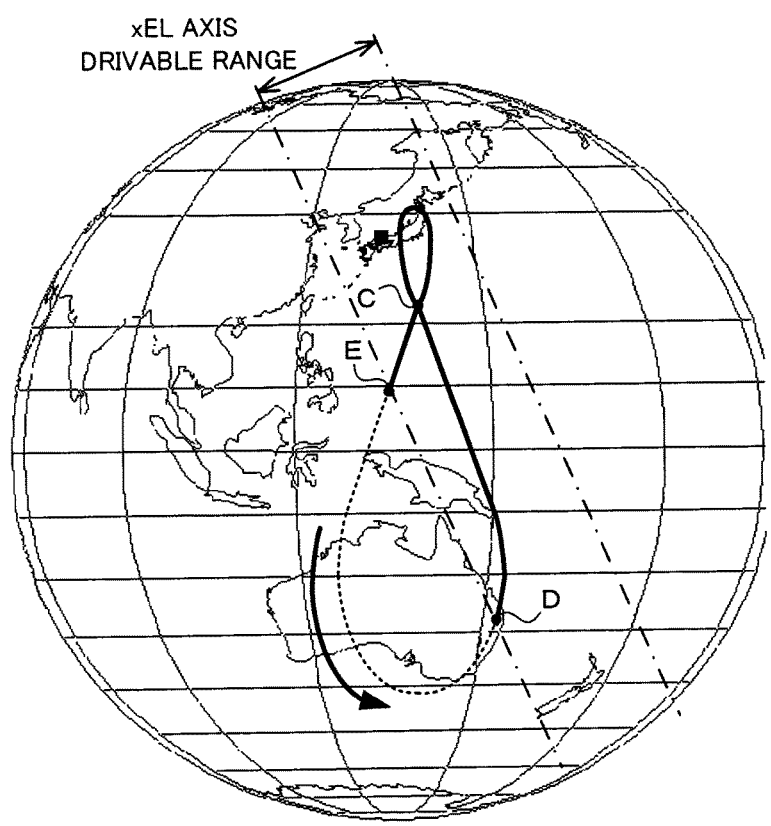
FIG. 24 is a drawing illustrating an example of a positional relationship between an antenna and a satellite orbit according to a third embodiment of the present disclosure.

An example is explained in which a satellite travels one round of a quasi-zenith orbit in one day. FIG. 24 is a drawing illustrating an example of a positional relationship between the antenna and a satellite orbit according to the third embodiment of the present disclosure. The solid line and the dashed line in FIG. 24 illustrate a satellite orbit, and the black square illustrates a position of the antenna 3. The satellite orbits in a quasi-zenith orbit in the arrow direction. When the zenith of the antenna 3 is outside the quasi-zenith orbit as illustrated in FIG. 24, the rotation determiner 23 determines that the AZ angle of the antenna 3 does not rotate 360 degrees or more in one day. In FIG. 24, a range surrounded by a dot-and-dash line is a range in which the xEL axis 6 can be driven in a state in which the AZ angle is set to an AZ angle at the time, for example, when the antenna 3 is directed to the intersection point C.

Even in a case in that the AZ angle of the antenna 3 does not rotate 360 degrees or more, while the estimated position of the satellite is in a range in which control using the xEL axis 6 can be performed in a state in which the AZ angle is set to a predetermined value that is permissible for the AZ angle, for example, and while the estimated position of the satellite is in a range starting from the intersection point C reaching to the intersection point C again after passing through a point D, the range being indicated by the solid line illustrated in FIG. 24,
the determiner 22 sends a command to the switching section 17 to cause performance of three-axis control, and sends a command to cause the AZ command operator 15 to output a command value that keeps the AZ angle at the predetermined value.

In a range from the intersection point C to a point E and a range from the point D to the intersection point C indicated by the solid line illustrated in FIG. 24, control can be performed using the AZ angle at the time when directed to the intersection point C.

However, in that case, as the AZ axis 4 is required to be rotated at high speed at the points D and E, the three-axis control is switched to the two-axis control at the intersection point C. While the estimated position of the satellite is in a range in which control using the xEL axis 6 cannot be performed, that is, while the estimated position of the satellite is in an orbit indicated by the dotted line illustrated in FIG. 24, the determiner 22 sends a command to the switching section 17 to cause performance of two-axis control.

By the above-mentioned process, in the example illustrated in FIG. 24, while the estimated position of the satellite is in the range starting from the intersection point C reaching to the intersection point C again after passing through the point D, the range being indicated by the solid line in FIG. 24, the tracking system 1 drives the AZ axis 4, the EL axis 5 and the xEL axis 6, and controls the beam direction 7 of the antenna 3 to track the satellite. In addition, while the estimated position of the satellite is in the range from the intersection point C to the point E, the range being indicated by the solid line illustrated in FIG. 24, in the range indicated by the dotted line or in the range from the point D to the intersection point C, the tracking system 1 drives the AZ axis 4 and the EL axis 5 and controls the beam direction 7 of the antenna 3 to track the satellite. When the zenith of the antenna 3 is positioned in the inside of the quasi-zenith orbit or when the quasi-zenith orbit is positioned at the zenith of the antenna 3, the tracking system 1 controls similar to the first embodiment or the second embodiment.

Figure 25:
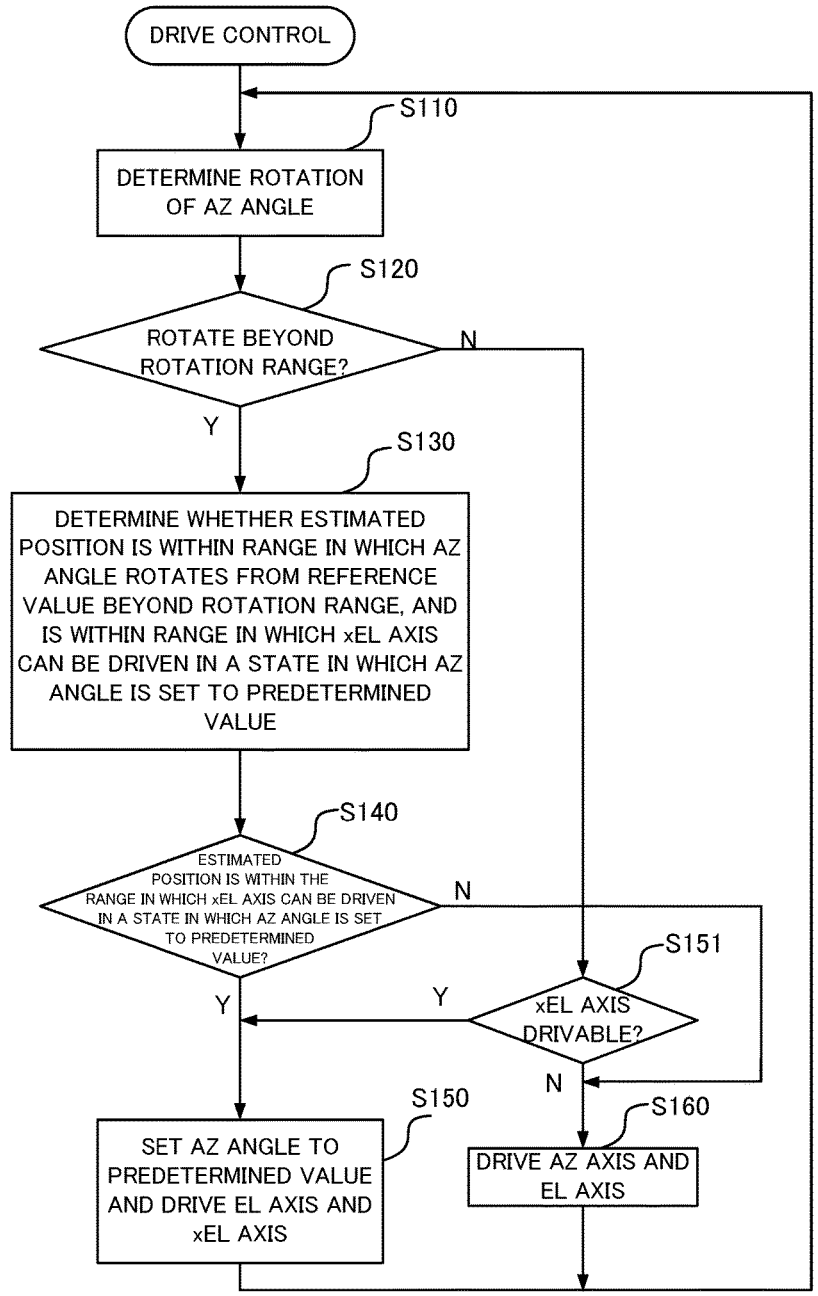
FIG. 25 is a flow chart illustrating an example of a driving and controlling operation performed by the tracking system according to the third embodiment.

FIG. 25 is a flow chart illustrating an example of operation of driving and controlling performed by the tracking system according to the third embodiment. Steps S110 to S150 are the same as the operation of the driving and controlling performed by the tracking system 1 according to the first embodiment illustrated in FIG. 19.

When the AZ angle of the antenna 3 does not rotate beyond the rotation range (step S120; N), and the estimated position of the satellite is within a range in which the xEL axis 6 can be driven in a state in which the AZ angle is set to the predetermined value that is permissible for the AZ angle (step S151; Y), the tracking system 1 drives the EL axis 5 and the xEL axis 6 in a state in which the AZ angle is set to the predetermined value by the AZ command operator 15, and controls the beam direction 7 of the antenna 3 to track the satellite (step S150). When the xEL axis 6 cannot be driven (step S151; N), the tracking system 1 drives the AZ axis 4 and the EL axis 5, and controls the beam direction 7 of the antenna 3 to track the satellite (step S160). The tracking system 1 performs the above-mentioned process repeatedly.

As described above, according to the tracking system 1 of the third embodiment, while the estimated position of the satellite is within a drivable range in which the AZ angle of the antenna 3 tracking a satellite rotates from the reference value beyond the rotation range, and in which the xEL axis 6 can be driven in a state in which the AZ angle is set to the predetermined value, the tracking system 1 can track a target without rewinding the cable 37, by setting the AZ angle to the predetermined value and driving the EL axis 5 and the xEL axis 6.

In addition, while the estimated position of the satellite is not within the above-mentioned drivable range, but is within a range in which the xEL axis 6 can be driven in a state in which the AZ angle is set to the predetermined value, or when the AZ angle of the antenna 3 does not rotate from the reference value beyond the rotation range, and while the estimated position of the satellite is within a range in which the xEL axis 6 can be driven in a state in which the AZ angle is set to the predetermined value that is permissible for the AZ angle, the tracking system 1 according to the third embodiment sets the AZ angle to the predetermined value and drives the EL axis 5 and the xEL axis 6.

Therefore when, for example, the zenith of the antenna 3 is outside the quasi-zenith orbit, three-axis control can be performed, this enables three-axis control to be performed in a wider range.

An embodiment of the present disclosure is not limited to the above-mentioned embodiments, and may also be configured by combining multiple embodiments among the above-mentioned embodiments. A tracking system 1 may be constructed to have only one of either the automatic tracking mode or the program tracking mode. The orbit traveled by the satellite is not limited to a quasi-zenith orbit, and may be any kind of orbit.

Figure 26:
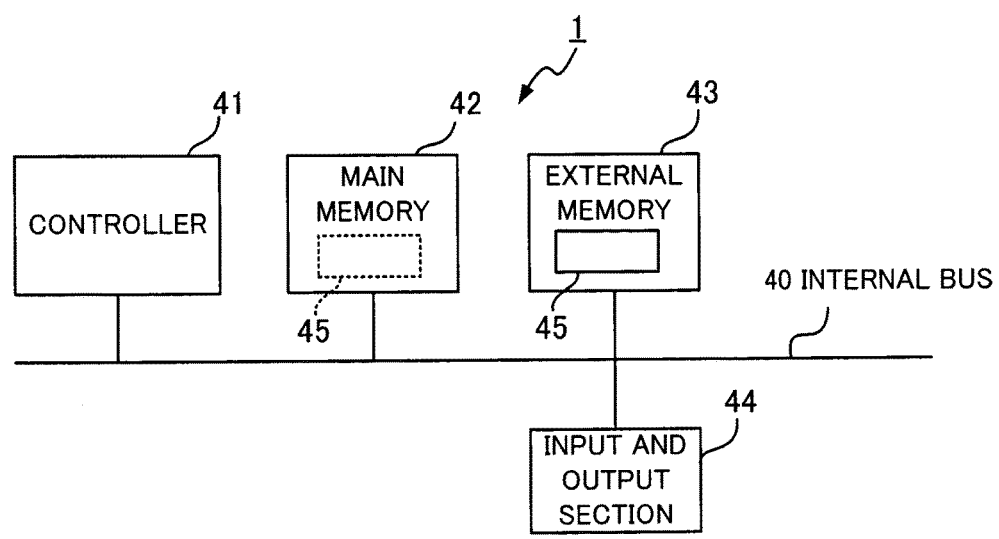
FIG. 26 is a block diagram illustrating an example of a physical configuration of a tracking system according to an embodiment of the present disclosure.

FIG. 26 is a block diagram illustrating an example of a physical configuration of a tracking system according to an embodiment of the present disclosure. The tracking system 1 includes a controller 41, a main memory 42, an external memory 43, and an input and output section 44. The main memory 42, the external memory 43 and the input and output section 44 are connected to the controller 41 through an internal bus 40.

The controller 41 is composed of a Central Processing Unit (CPU) and the like, and executes a process for tracking a target performed by the tracking system 1 according to a control program 45 stored in the external memory 43. The main memory 42 is composed of a Random-Access Memory (RAM) and the like, and loads the control program 45 stored in the external memory 43 and is used as a working area of the controller 41.

The external memory 43 composed of a nonvolatile memory such as a flash memory, a hard disk, a Digital Versatile Disc Random-Access Memory (DVD-RAM), or a Digital Versatile Disc Rewritable (DVD-RW), pre-stores the control program 45 for causing the controller 41 to perform the above-mentioned process, supplies the data stored in the control program 45 to the controller 41 according to an instruction of the controller 41 and stores the data supplied from the controller 41.

The input and output section 44 is composed of a serial interface or a parallel interface. External equipment is connected to the input and output section 44. For example, the prediction value acquirer 21 included in the tracking system 1 acquires an orbit prediction value from external equipment.

Control program 45 execute processes of each part of the tracking system 1 illustrated in FIG. 1 by using the controller 41, the main memory 42, the external memory 43 and input/output section 44 as resources.

In addition, the aforementioned hardware configurations and flow charts are exemplary and can be modified and corrected arbitrarily.

The central portion for control process that includes the controller 41, main memory 42, external memory 43, internal bus 40, and the like, can be realized by a common computing system, without depending on an exclusive system. For example, a computer program to execute the above-mentioned operations may be stored and distributed in a computer-readable recording medium such as flexible disk, CD-ROM, DVD-ROM and the like, and the computer program may be installed in a computer to construct a tracking system 1 that executes the above-mentioned processes. In addition, the computer program may be stored in a storage device included in a server device on a communication network such as the Internet, and the computer system may be downloaded by a common computer to construct a tracking system 1.

In addition, when the functions of the tracking system 1 are realized by sharing between an operating system (OS)

and an application program, or are realized by cooperation between the OS and the application program, storage of just the application program portion in the recording medium and storage device is permissible.

In addition, a computer program can be superimposed onto a carrier wave for delivery via a communication network. For example, the computer program may be uploaded to a Bulletin Board System (BBS) on a communication network, and the computer program may be delivered via a network. The tracking system 1 may be configured to execute the above-mentioned processes by starting the computer program and executing the computer program under the control of the OS in a manner similar to that of other application programs.

The present disclosure can be embodied in various ways and can undergo various modifications without departing from the broad spirit and scope of the disclosure. Moreover, the embodiments described above are for explaining the present disclosure, and do not limit the scope of the present disclosure. In other words, the scope of the present disclosure is as set forth in the claims and not the embodiment. Various changes and modifications that are within the scope disclosed in the claims, or that are within a scope that is equivalent to the claims of the disclosure, are also included within the scope of the present disclosure.

This application claims priority based on Japanese Patent Application No. 2013-139493, filed on Jul. 3, 2013, and including the specification, the claims, the drawings, and the abstract. The entire contents of Japanese Patent Application No. 2013-139493 are incorporated herein by reference in their entirety.

REFERENCE SIGNS LIST

1 Tracking system
2 Tracker
3 Antenna
4 AZ axis
5 EL axis
6 xEL axis
7 Beam direction
8 Base
11 Power feeding device
12 Tracking receiver
13 Operational processor
14 Coordinate converter
15 AZ command operator
16 Program operator
17 Switching section
18 xEL servo operator
19 EL servo operator
20 AZ servo operator
21 Prediction value acquirer
22 Determiner
23 Rotation determiner
24 Orbit determiner
31 xEL driver
32 EL driver
33 AZ driver
34 Main reflecting mirror
35 Sub-reflecting mirror
36 Cable winding mechanism
37 Cable
38 Rotor
39 Fixed portion
40 Internal bus
41 Controller
42 Main memory
43 External memory
44 Input and output section
45 Control program

The invention claimed is:

1. A tracking system to control a beam direction of an antenna to track a target to receive a signal from the target by driving drive axes of the antenna, the tracking system comprising:
a processor coupled to memory and configured to:
determine, based on a position of the tracking system relative to an orbit of the target, whether an azimuth angle of the antenna tracking the target rotates from a predetermined reference value beyond a predetermined rotation range within a predetermined duration of time based on an orbit prediction value that is a predicted value of a position of the target;
determine whether an estimated position of the target, based on either the orbit prediction value, or orbit information of the target, is within a drivable range in which the azimuth angle rotates from the reference value beyond the rotation range, and in which a cross elevation axis of the drive axes can be driven in a state in which an angle of an azimuth axis of the drive axes is set to a predetermined value that is permissible for the azimuth angle, when the processor determines that the azimuth angle rotates from the reference value beyond the rotation range; and
a tracker including an operational processor and one or more servo motors configured to:
drive an elevation axis and the cross elevation axis of the drive axes and to control the beam direction of the antenna to track the target according to the orbit prediction value or an angle error signal indicating an error in the beam direction of the antenna, the angle error signal being generated based on the received signal, in a state in which the angle of the azimuth axis is set to the predetermined value, while the estimated position is within the drivable range when the processor determines that the azimuth angle rotates from the reference value beyond the rotation range; and
drive the azimuth axis and the elevation axis and to control the beam direction of the antenna to track the target according to the angle error signal or the orbit prediction value, while the estimated position is not within the drivable range when the processor determines that the azimuth angle rotates from the reference value beyond the rotation range, or when the processor determines that the azimuth angle does not rotate from the reference value beyond the rotation range.

2. The tracking system according to claim 1, wherein
the target orbits in a quasi-zenith orbit having an intersection point;
the processor sets the drivable range, in which the azimuth angle rotates from the reference value beyond the rotation range, to be a range starting from the intersection point reaching to the intersection point again; and
when the processor determines that the azimuth angle rotates from the reference value beyond the rotation range and while the estimated position is within the drivable range, the tracker drives the elevation axis and the cross elevation axis and controls the beam direction of the antenna to track the target according to the angle error signal or the orbit prediction value in a state in which an angle of the azimuth axis is set to an angle of the azimuth axis when the antenna is directed to the intersection point, and when the processor determines that the azimuth angle rotates from the reference value beyond the rotation range and while the estimated position is not within the drivable range, or when the processor determines that the azimuth angle does not rotate from the reference value beyond the rotation range, the tracker drives the azimuth axis and the elevation axis and controls the beam direction of the antenna to track the target according to the angle error signal or the orbit prediction value.

3. The tracking system according to claim 2, wherein the tracker drives the elevation axis and the cross elevation axis and controls the beam direction of the antenna to track the target according to the angle error signal or the orbit prediction value:

in a state in which, when the processor determines that the azimuth angle rotates from the reference value beyond the rotation range and while the estimated position is not within the drivable range and is within a range in which the cross elevation axis can be driven in a state in which an angle of the azimuth axis is set to the predetermined value, the angle of the azimuth axis is set to the predetermined value; and, in a state in which, when the processor determines that the azimuth angle does not rotate from the reference value beyond the rotation range and while the estimated position is within a range in which the cross elevation axis can be driven in a state in which an angle of the azimuth axis is set to a predetermined value that is permissible for the azimuth angle, the angle of the azimuth axis is set to the predetermined value.

4. The tracking system according to claim 1, wherein the tracker drives the elevation axis and the cross elevation axis and controls the beam direction of the antenna to track the target according to the angle error signal or the orbit prediction value:

in a state in which, when the processor determines that the azimuth angle rotates from the reference value beyond the rotation range and while the estimated position is not within the drivable range of the azimuth axis and is within a range in which the cross elevation axis can be driven in a state in which an angle of the azimuth axis is set to the predetermined value, the angle of the azimuth axis is set to the predetermined value; and, in a state in which, when the processor determines that the azimuth angle does not rotate from the reference value beyond the rotation range and while the estimated position is within a range in which the cross elevation axis can be driven in a state in which an angle of the azimuth axis is set to a predetermined value that is permissible for the azimuth angle, the angle of the azimuth axis is set to the predetermined value.

5. A tracking method for controlling a beam direction of an antenna to track a target to receive a signal from the target by driving drive axes of the antenna, the tracking method comprising:

determining, with a processor and, based on a position of the antenna relative to an orbit of the target, whether an azimuth angle of the antenna tracking the target rotates from a predetermined reference value beyond a predetermined rotation range within a predetermined duration of time based on an orbit prediction value that is a predicted value of a position of the target;

determining, with the processor, whether an estimated position of the target, based on the orbit prediction value or orbit information of the target, is within a drivable range in which the azimuth angle rotates from the reference value beyond the rotation range, and in which a cross elevation axis of the drive axes can be driven in a state in which an angle of an azimuth axis of the drive axes is set to a predetermined value that is permissible for the azimuth angle, when the azimuth angle is determined to rotate from the reference value beyond the rotation range;

driving, with a tracker that includes an operational processor and one or more servo motors, an elevation axis and the cross elevation axis of the drive axes and controlling the beam direction of the antenna to track the target according to the orbit prediction value or an angle error signal indicating an error in the beam direction of the antenna, the angle error signal being generated based on the received signal, in a state in which the angle of the azimuth axis is set to the predetermined value, when the azimuth angle is determined to rotate from the reference value beyond the rotation range and while the estimated position is within the drivable range; and driving, with the tracker, the azimuth axis and the elevation axis and controlling the beam direction of the antenna to track the target according to the angle error signal or the orbit prediction value, when the azimuth angle is determined to rotate from the reference value beyond the rotation range and while the estimated position is not within the drivable range, or when the azimuth angle is determined not to rotate from the reference value beyond the rotation range.

6. The tracking method according to claim 5, wherein the target orbits in a quasi-zenith orbit having an intersection point;

the drivable range, in which the azimuth angle rotates from the reference value beyond the rotation range, is set to be a range starting from the intersection point reaching to the intersection point again;

when the azimuth angle is determined to rotate from the reference value beyond the rotation range and while the estimated position is within the drivable range, the elevation axis and the cross elevation axis are driven and the beam direction of the antenna is controlled to track the target according to the angle error signal or the orbit prediction value in a state in which an angle of the azimuth axis is set to an angle of the azimuth axis when the antenna is directed to the intersection point, and when the azimuth angle is determined to rotate from the reference value beyond the rotation range and while the estimated position is not within the drivable range, or when the azimuth axis is determined not to rotate from the reference value beyond the rotation range, the azimuth axis and the elevation axis are driven and the beam direction of the antenna is controlled to track the target according to the angle error signal or the orbit prediction value.

7. The tracking method according to claim 6, wherein the elevation axis and the cross elevation axis are driven and the beam direction of the antenna is controlled to track the target according to the angle error signal or the orbit prediction value:

in a state in which an angle of the azimuth axis is set to the predetermined value when the azimuth angle is determined to rotate from the reference value beyond the rotation range and while the estimated position is not within the drivable range and is within a range in which the cross elevation axis can be driven in a state in which the angle of the azimuth axis is set to the predetermined value; and, in a state in which the angle of the azimuth axis is set to the predetermined value when the azimuth angle is determined not to rotate from the reference value beyond the rotation range and while the estimated position is within a range in which the cross elevation axis can be driven in a state in which the angle of the azimuth axis is set to the predetermined value that is permissible for the azimuth angle.

8. The tracking method according to claim 5, wherein
the elevation axis and the cross elevation axis are driven and the beam direction of the antenna is controlled to track the target according to the angle error signal or the orbit prediction value:

in a state in which an angle of the azimuth axis is set to the predetermined value when the azimuth angle is determined to rotate from the reference value beyond the rotation range and while the estimated position is not within the drivable range of the azimuth axis and is within a range in which the cross elevation axis can be driven in a state in which the angle of the azimuth axis is set to the predetermined value; and, in a state in which the angle of the azimuth axis is set to the predetermined value when the azimuth angle is determined not to rotate from the reference value beyond the rotation range and while the estimated position is within a range in which the cross elevation axis can be driven in a state in which the angle of the azimuth axis is set to the predetermined value that is permissible for the azimuth angle.

9. A non-transitory computer-readable recording medium having recorded thereon a program for causing a computer, controlling a tracking system to control a beam direction of an antenna to track a target to receive a signal from the target by driving drive axes of the antenna, to execute:

determining, based on a position of the tracking system relative to an orbit of the target, whether an azimuth angle of the antenna tracking the target rotates from a predetermined reference value beyond a predetermined rotation range within a predetermined duration of time based on an orbit prediction value that is a predicted value of a position of the target;

determining whether an estimated position of the target, based on the orbit prediction value or orbit information of the target, is within a drivable range in which the azimuth angle rotates from the reference value beyond the rotation range, and in which a cross elevation axis of the drive axes can be driven in a state in which an angle of an azimuth axis of the drive axes is set to a predetermined value that is permissible for the azimuth angle, when the azimuth axis is determined to rotate from the reference value beyond the rotation range;

driving an elevation axis and the cross elevation axis of the drive axes and controlling the beam direction of the antenna to track the target according to the orbit prediction value or an angle error signal indicating an error in the beam direction of the antenna, the angle error signal being generated based on the received signal, in a state in which the angle of the azimuth axis is set to the predetermined value, when the azimuth angle is determined to rotate from the reference value beyond the rotation range and while the estimated position is within the drivable range; and driving the azimuth axis and the elevation axis and controlling the beam direction of the antenna to track the target according to the angle error signal or the orbit prediction value, when the azimuth angle is determined to rotate from the reference value beyond the rotation range and while the estimated position is not within the drivable range, or when the azimuth angle is determined not to rotate from the reference value beyond the rotation range.

* * * * *